United States Patent
Avila et al.

(10) Patent No.: US 12,235,925 B2
(45) Date of Patent: *Feb. 25, 2025

(54) INTERACTIVE PATH TRACING ON THE WEB

(71) Applicant: Hover Inc., San Francisco, CA (US)

(72) Inventors: Francisco Avila, San Francisco, CA (US); Lucas Crane, San Francisco, CA (US); Abhishek Tripathi, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,799

(22) Filed: Feb. 26, 2024

(65) Prior Publication Data

US 2024/0202270 A1 Jun. 20, 2024

Related U.S. Application Data

(63) Continuation of application No. 17/879,737, filed on Aug. 2, 2022, now Pat. No. 11,954,169, which is a
(Continued)

(51) Int. Cl.
*G06F 16/957* (2019.01)
*G06F 15/00* (2006.01)
(Continued)

(52) U.S. Cl.
CPC ............ *G06F 16/9577* (2019.01); *G06T 1/20* (2013.01); *G06T 15/005* (2013.01); *G06T 15/04* (2013.01);
(Continued)

(58) Field of Classification Search
CPC ..... G06F 16/9577; G06T 1/20; G06T 15/005; G06T 15/04; G06T 15/08; G06T 15/205;
(Continued)

(56) References Cited

U.S. PATENT DOCUMENTS 5,710,876 A 1/1998 Peercy
7,427,986 B2 9/2008 Pellacini et al.
(Continued)

OTHER PUBLICATIONS

Avila, Notice of Allowance, U.S. Appl. No. 17/067,512, Apr. 28, 2022, 10 pgs.
(Continued)

*Primary Examiner* — Vijay Shankar
(74) *Attorney, Agent, or Firm* — Morgan, Lewis & Bockius LLP

(57) ABSTRACT

A method renders photorealistic images in a web browser. The method is performed at a computing device having a general purpose processor and a graphics processing unit (GPU). The method includes obtaining an environment map and images of an input scene. The method also includes computing textures for the input scene including by encoding an acceleration structure of the input scene. The method further includes transmitting the textures to shaders executing on a GPU. The method includes generating samples of the input scene, by performing at least one path tracing algorithm on the GPU, according to the textures. The method also includes lighting or illuminating a sample of the input scene using the environment map, to obtain a lighted scene, and tone mapping the lighted scene. The method includes drawing output on a canvas, in the web browser, based on the tone-mapped scene to render the input scene.

20 Claims, 17 Drawing Sheets

Related U.S. Application Data continuation of application No. 17/067,512, filed on Oct. 9, 2020, now Pat. No. 11,429,690.

(60) Provisional application No. 63/067,249, filed on Aug. 18, 2020, provisional application No. 62/913,663, filed on Oct. 10, 2019.

(51) Int. Cl.

| | | |
|---|---|---|
| *G06F 15/04* | (2006.01) | |
| *G06F 15/08* | (2006.01) | |
| *G06F 17/10* | (2006.01) | |
| *G06T 1/20* | (2006.01) | |
| *G06T 15/00* | (2011.01) | |
| *G06T 15/04* | (2011.01) | |
| *G06T 15/08* | (2011.01) | |
| *G06T 15/20* | (2011.01) | |
| *G06T 15/50* | (2011.01) | |
| *G06T 15/80* | (2011.01) | |
| *G06T 17/10* | (2006.01) | |
| *G06T 17/20* | (2006.01) | |
| *H04L 67/02* | (2022.01) | |

(52) U.S. Cl.
CPC ............ *G06T 15/08* (2013.01); *G06T 15/205* (2013.01); *G06T 15/50* (2013.01); *G06T 15/80* (2013.01); *G06T 17/10* (2013.01); *G06T 17/205* (2013.01); *H04L 67/02* (2013.01)

(58) Field of Classification Search
CPC ......... G06T 15/50; G06T 15/80; G06T 17/10; G06T 17/205; G06T 2200/24; G06T 2215/12; G06T 15/06; H04L 67/02; H04L 67/04; H04L 67/53
See application file for complete search history.

(56) References Cited

U.S. PATENT DOCUMENTS

| | | | |
|---|---|---|---|
| 7,808,503 | B2 | 10/2010 | Duluk, Jr. et al. |
| 7,844,106 | B2 | 11/2010 | Pfister et al. |
| 9,142,056 | B1 | 9/2015 | Baran et al. |
| 9,582,247 | B1 | 2/2017 | Milliron et al. |
| 10,665,011 | B1 | 5/2020 | Sunkavalli et al. |
| 10,867,214 | B2 | 12/2020 | Tremblay et al. |
| 10,893,262 | B2 | 1/2021 | Vetter et al. |
| 11,158,032 | B2 | 10/2021 | Atkins et al. |
| 11,429,690 | B2 * | 8/2022 | Avila ...................... G06T 17/10 |
| 11,954,169 | B2 * | 4/2024 | Avila ................... G06T 15/005 |
| 2006/0209067 | A1 | 9/2006 | Pellacini et al. |
| 2007/0165035 | A1 | 7/2007 | Duluk et al. |
| 2009/0074238 | A1 | 3/2009 | Pfister et al. |
| 2016/0241838 | A1 | 8/2016 | Cole et al. |
| 2018/0176483 | A1 | 6/2018 | Knorr et al. |
| 2019/0251397 | A1 | 8/2019 | Tremblay et al. |
| 2020/0013151 | A1 | 1/2020 | Atkins et al. |
| 2022/0051467 | A1 * | 2/2022 | Woop ...................... G06T 9/001 |
| 2024/0203038 | A1 * | 6/2024 | Liu ..................... G06F 3/04845 |

OTHER PUBLICATIONS

Hover Inc., PCT/US2020/055261, International Search Report and Written Opinion, Mar. 30, 2021, 16 pgs.

Lesar et al., "Real-Time Interactive Platform-Agnostic Volumetric Path Tracing in WebGL 2.0," ACM, Jun. 22, 2018, Web3D'18, Jun. 20-22, 2018, Pozman, Poland, retrieved from URL: https.//dl.acm.org/doi/pdf/10.1145/3208806.3208814, 7 pgs.

Avila, Notice of Allowance, U.S. Appl. No. 17/879,737, Dec. 4, 2023, 9 pgs.

* cited by examiner

INTERACTIVE PATH TRACING ON THE WEB

RELATED APPLICATIONS

This application is a continuation of U.S. patent application Ser. No. 17/879,737, filed Aug. 2, 2022, entitled "Interactive Path Tracing on the Web," which is a continuation of U.S. patent application Ser. No. 17/067,512, filed Oct. 9, 2020 (now U.S. Pat. No. 11,429,690), entitled "Interactive Path Tracing on the Web," each of which is hereby incorporated by referenced in its entirety. U.S. patent application Ser. No. 17/067,512 further claims priority to (i) U.S. Provisional Patent Application No. 62/913,663, filed Oct. 10, 2019, entitled "Interactive Path Tracing on the Web" and (ii) U.S. Provisional Patent Application No. 63/067,249, filed Aug. 18, 2020, entitled "Interactive Path Tracing on the Web," each of which are incorporated by reference herein in their entirety.

TECHNICAL FIELD

The disclosed implementations relate generally to image rendering and more specifically to rendering photorealistic images in a web browser using path tracing.

BACKGROUND 3D building models and visualization tools can produce significant cost savings. Using accurate 3D models of properties, homeowners, for instance, can estimate and plan every project. With near real-time feedback, contractors could provide customers with instant quotes for remodeling projects. Interactive tools can enable users to view objects (e.g., buildings) under various conditions (e.g., at different times, under different weather conditions). Typically, a user captures images using a mobile camera, and subsequently uses a web browser to view the objects in the images under different conditions. Traditional web browsers use WebGL that incorporates a technique called rasterization to render images. However, rasterization does not deliver the same visual quality and realism as other advanced techniques like path tracing. At the same time, path tracing is computationally intensive and current implementations do not provide interactive rendering on low-performance hardware.

SUMMARY

Accordingly, there is a need for systems and methods that render photorealistic images in a web browser using path tracing. The techniques disclosed herein enable interactive path tracing on the web for static or dynamic scenes on low powered devices. Some implementations allow users to access photorealistic rendering in their browser by seamlessly switching between rasterization and path tracing. The proposed techniques can enhance user experience in a wide range of applications, such as e-commerce, product design, cultural heritage, and architecture visualizations.

Systems, methods, devices, and non-transitory computer readable storage media for rendering photorealistic images in a web browser are disclosed. In some implementations, a method of rendering photorealistic images in a web browser is provided. The method is performed in a computing device having a general purpose processor and a graphics processing unit (GPU). The method includes obtaining an environment map, such as a high dynamic range image (HDRI), that includes illumination values, positional vectors and transforms of objects in an environment. The method also includes obtaining at least one image of an input scene. The method further includes computing textures for the input scene including by encoding, as part of the textures, an acceleration structure (for example, a bounding volume hierarchy (BVH)) of the input scene. The method also includes transmitting the textures to one or more shaders executing on a GPU. The method further includes generating, on the GPU, samples of the input scene, by performing a path tracing algorithm in the one or more shaders according to the textures. The method also includes lighting or illuminating, on the GPU, a respective sample of the input scene using the environment map, to obtain a lighted scene. The method also includes tone mapping the lighted scene to obtain a tone-mapped scene, and drawing output on a canvas, in the web browser, based on the tone-mapped scene to render the input scene.

In some implementations, the at least one image is obtained from a camera, such as an aerial or oblique view image capture platform. In some implementations, the camera is configured as a perspective camera that models a thin lens to produce a photorealistic depth-of-field effect of the input scene.

In some implementations, the method further includes obtaining sensor information corresponding to the instant when the input scene is captured, encoding the sensor information in the textures while computing the textures for the input scene, and utilizing the sensor information to light or illuminate the respective sample of the input scene.

In some implementations, the method further includes, prior to computing textures for the input scene, obtaining and substituting a 3D model for an object (e.g., a building) representing the at least one image in the input scene.

In some implementations, the method further includes obtaining a first image and a second image of the input scene, determining if a mesh in the input scene changed between the first image and the second image of the input scene, and, in accordance with a determination that a mesh in the input scene changed, regenerating the acceleration structure of the input scene using the second image.

In some implementations, the encoding of the acceleration structure is limited to static geometry based on size of the input scene and hardware capabilities of the general purpose processor. In some implementations, acceleration structures for dynamic objects are encoded. Encoding, in some implementations is a function of system resources to include network bandwidth and hardware capabilities.

In some implementations, generating the texture includes packing the acceleration structure (e.g., BVH) into an array and storing the array as a data texture for the one or more shaders to process. In some implementations, the one or more shaders traverse the acceleration structure (e.g., BVH) using a stack-based algorithm.

In some implementations, the path at least one path tracing algorithm is a cumulative distribution function of the environment map. In some implementations, the lighting or illumination multiple importance samples the input scene using the cumulative distribution function of the environment map averaged with a bidirectional reflectance distribution function of a material of the input scene.

In some implementations, the method further includes selecting a material for the input scene including specifying a level of refraction for the material, and sending data corresponding to the material along with the texture to the one or more shaders executing on the GPU, thereby causing the one or more shaders to utilize the data corresponding to the material while generating samples of the input scene. In some implementations, the material is a surface material and is represented using property maps that include at least one of: diffuse maps that control reflective color of the material, normal maps that perturbs a normal vector to the surface, and roughness and metalness maps describing texture of the surface. In some implementations, the material is a surface material that is represented using an artist-tailored BRDF. In some implementations, the material is a glass material that realistically reflects and refracts light by biasing importance sampled rays based on indices of the material or the angle of incidence of a ray upon the material. For example, under the Fresnel equations, light is perceived as more reflective at grazing angles and these angles could be importance sampled in some implementations.

In some implementations, the at least one path tracing algorithm iteratively renders samples of the input scene. In some implementations, the method further includes, in accordance with a determination that a user has performed a predetermined action or the system resources has reached a predetermined threshold, causing the one or more shaders to pause the at least one path tracing algorithm. In some implementations, the at least one path tracing algorithm averages each generated sample with previously generated samples. In some implementations, the method further includes, in accordance with a determination that the scene has changed, causing the one or more shaders to pause the at least one path tracing algorithm.

In some implementations, the at least one path tracing algorithm uses multiple importance sampling. In some implementations, the multiple importance sampling favors ray selection in directions towards light sources in an environment map with the highest intensity.

In some implementations, the at least one path tracing algorithm is implemented in Web GL, and in preferred implementations on WebGL 2, and the method further includes, causing the one or more shaders to rasterize a full-screen quad to the screen prior to executing the at least one path tracing algorithm, and using a fragment shader to execute the at least one path tracing algorithm for the full-screen quad to output one or more pixels to a framebuffer.

In some implementations, each sample is rendered to an internal buffer.

In some implementations, the method further includes predicting a cost of material required to build the objects in the environment according to the rendering.

In some implementations, computing the textures for the input scene is performed on the general purpose processor and the computing device is a low-power device that does not have a high-speed Internet connection.

In another aspect, a method is provided for accelerating rendering of graphical images using a GPU in accordance with some implementations. The method includes obtaining an input scene from a camera. The method also includes computing a plurality of triangle meshes corresponding to the input scene. The method also includes calculating position vertices, normal vectors, and UV coordinates for each triangle mesh, and calculating an acceleration structure of the input scene. In some implementations, the acceleration structure is a bounding volume hierarchy (BVH); in some implementations, the acceleration structure is a grid (such as an irregular grid). Though grid or k-d tree acceleration structures are quick to construct and traverse, they suffer from empty cells and are difficult to fit to complex geometry. Input scene selection and system resources may therefore dictate a particular acceleration structure. In some implementations, a default acceleration structure is calculated as a BVH, but regenerated as a second acceleration structure to optimize traversal time. The computing device computes a texture map for the input scene by packaging at least texels encoding the position vertices, the normal vectors, the UV coordinates, and the acceleration structure. The method includes transmitting the texture map to the GPU. The method further includes decoding, by the GPU, the texture map to extract RGBA channels. The method includes generating, by the GPU, using one or more shaders, samples of the input scene, by performing a path tracing algorithm on the RGBA channels.

In some implementations, the texture map is a WebGL texture, and each texel is a floating-point number. In some implementations, the method further includes determining precision of the floating-point numbers depending on whether memory or precision is optimized.

In some implementations, computing the texture map includes encoding the texture map as an 1-dimensional array, determining a size of the 1-dimensional array, and determining dimensions of the texture map according to the size of the 1-dimensional array and a predetermined mathematical formula.

In some implementations, the texture map is encoded as an 1-dimensional array. The method includes decoding the texture map by performing a sequence of steps for each position of a plurality of positions in the 1-dimensional array. The sequence of steps includes computing coordinates of a texel corresponding to the respective position, extracting the texel from the 1-dimensional array based on the coordinates, and extracting RGBA channels by indexing the texel. In some implementations, the method includes storing the texel to a vector register and extracting the RGBA channels by manipulating the vector register.

In another aspect, a method is provided for rendering images using path tracing, and performing temporal denoising, in accordance with some implementations. The method includes obtaining an input scene from a camera. The method also includes rendering a current frame of the input scene from a current pose, with one path-traced sample per pixel, including storing specular and diffuse light contributions to separate buffers. The method also includes obtaining a prior frame corresponding to a prior pose of the camera. The current frame and the prior frame have at least one overlapping pixel and each of the current frame and prior frame image data includes RGBA channels with red, green, and blue (RGB) channels set to light contribution, and alpha channel set to 1, for each pixel. The method also includes re-projecting samples from the prior frame into the current frame based on the alpha channel corresponding to each overlapping pixel with the current frame, including (i) blending diffuse light of the current frame with diffuse light of at least the prior frame using a long temporal filter, and (ii) blending specular light of the current frame with specular light of at least the prior frame using a short temporal filter, based on separate buffers for the specular and diffuse light. The method also includes updating the current frame with the re-projected samples, including storing a number of samples rendered in the alpha channel for each pixel. In some implementations, the method also includes repeating obtaining a new input scene, rendering a current frame, and blending the current frame reusing samples.

In some implementations, re-projecting samples from the prior frame into the current frame includes, for each pixel of the current frame: (i) determining if a surface corresponding to the pixel is visible in the prior frame; and (ii) in accordance with a determination that the surface is visible in the prior frame, averaging the RGB channels for the pixel with corresponding values from the re-projected samples.

In some implementations, determining if the surface is visible includes: (i) calculating a surface position of the pixel; (ii) projecting the surface position to coordinates in the prior frame; (iii) determining if a first mesh identifier for the surface position at the coordinates for the prior frame matches a second mesh identifier for the current frame; and (iv) in accordance with a determination that the first mesh identifier and the second mesh identifier match, determining that the surface is visible in the prior frame.

In some implementations, averaging the RGB channels includes: (i) adding the RGBA channels for the pixel of the prior frame to the RGBA channels for the pixel of the current frame; and (ii) dividing each of the RGB channels for the pixel of the current frame by value of the alpha channel for the pixel of the current frame.

In some implementations, the method further includes: (i) detecting if the camera has moved or is still; (ii) in response to detecting that the camera has moved, blending the current frame with the re-projected samples from the prior frame using an exponential average; and (iii) in response to detecting that the camera is still, linearly blending the current frame with the re-projected samples from the prior frame.

In some implementations, the method further includes: (i) detecting if the camera is moving; and (ii) in response to detecting that the camera is moving, blurring at least a portion of the current frame.

In some implementations, the method further includes: repeating obtaining a new input scene, rendering a current frame, and blending the current frame reusing samples.

In another aspect, a computer system includes one or more processors, memory, and one or more programs stored in the memory. The programs are configured for execution by the one or more processors. The programs include instructions for performing any of the methods described herein.

In another aspect, a non-transitory computer readable storage medium stores one or more programs configured for execution by one or more processors of a computer system. The programs include instructions for performing any of the methods described herein.

BRIEF DESCRIPTION OF THE DRAWINGS

Like reference numerals refer to corresponding parts throughout the drawings.

DESCRIPTION OF IMPLEMENTATIONS

Reference will now be made to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Disclosed implementations enable rendering photorealistic images in a web browser. Systems and devices implementing the image rendering techniques in accordance with some implementations are illustrated in FIGS. 1-3K.

Figure 1:
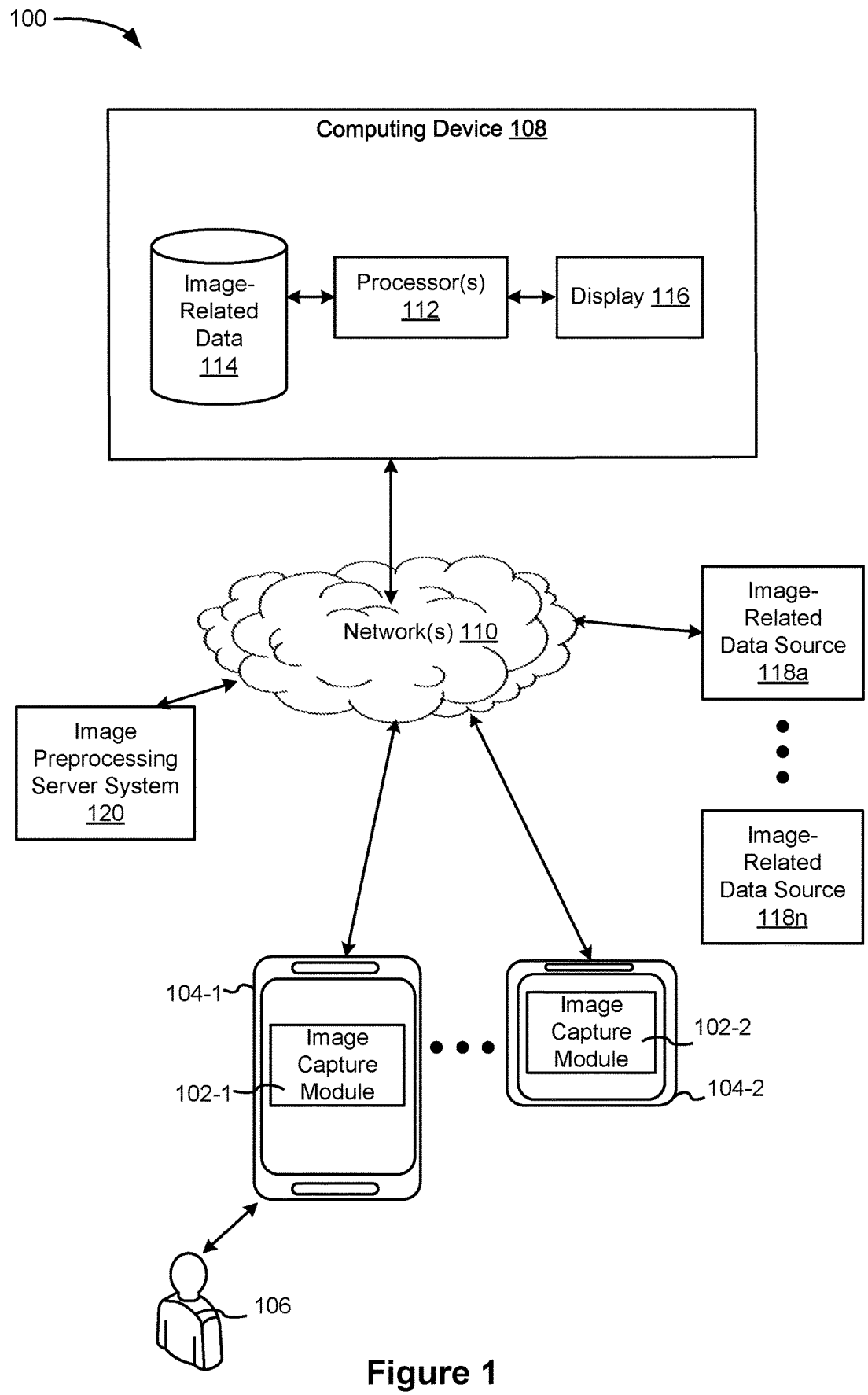
FIG. 1 is a block diagram of a computing system for rendering photorealistic images in a web browser in accordance with some implementations.

FIG. 1 is a block diagram of a computer system 100 that enables rendering photorealistic images in a web browser in accordance with some implementations. In some implementations, the computer system 100 includes image capture modules 102-1, 102-2, . . . executed on image capturing devices 104-1, 104-2, . . . , image-related data sources 118a, . . . , 118n, an image preprocessing server system 120, and a computing device 108.

An image capturing module 102 communicates with the computing device 108 through one or more networks 110. The image capturing module 102 provides image capture functionality (e.g., take photos of images) and communications with the computing device 108. The image preprocessing server system 120 provides server-side functionality (e.g., preprocessing images, such as creating textures, storing environment maps and images and handling requests to transfer images) for any number of image capture modules 102 each residing on a respective image capture device 104.

In some implementations, the image capture devices 104 are computing devices, such as desktops, laptops, and mobile devices, from which users 106 can capture images (e.g., take photos), discover, view, edit, and/or transfer images.

The computing device 108 connects to the image-related data sources 118 to obtain one or more images in response to a request to render an image on a web browser. In some implementations, the request is initiated by a user connected to the computing device 108 via one or more input devices (not shown), or by a user (e.g., the user 106) uploading images via an image capture device (e.g., the device 104). In some implementations, the request directs the image preprocessing server system 120 to preprocess the images received from the image capture device 104, retrieve one or more additional related images from the image-related data sources 118, and/or supply the preprocessed (or packaged) data to the computing device 108.

The computer system 100 shown in FIG. 1 includes both a client-side portion (e.g., the image capture module 102 and modules on the computing device 108) and a server-side portion (e.g., a module in the server system 120). In some implementations, data preprocessing is implemented as a standalone application installed on the computing device 108 and/or the image capture device 104. In addition, the division of functionality between the client and server portions can vary in different implementations. For example, in some implementations, the image capture module 102 is a thin-client that provides only image search requests and output processing functions, and delegates all other data processing functionality to a backend server (e.g., the server system 120). In some implementations, the computing device 108 delegates image processing functions to the server system 120.

The communication network(s) 110 can be any wired or wireless local area network (LAN) and/or wide area network (WAN), such as an intranet, an extranet, or the Internet. It is sufficient that the communication network 110 provides communication capability between the server system 120, the image capture devices 114, the image-related data sources 118, and/or the computing device 108.

In some implementations, the computing device 108 includes one or more processors 112, one or more image related databases 114, and a display 116. Although not shown, in some implementations, the computing device 108 further includes one or more I/O interfaces that facilitate the processing of input and output associated with the image capture devices 104 and/or the server system 120. One or more processors 112 obtain images and information related to images from image-related data sources 118 (e.g., in response to a request to render an image on a web browser), processes the images and related information, and stores the image references along with the information in the image related database 114. The image-related database 114 stores various information, including but not limited to catalogs, images, image metadata, image information, geographic information, map information, among others. The image-related data 114 may also store a plurality of record entries relevant to the users associated with images. I/O interfaces facilitate communication with one or more image-related data sources 118 (e.g., image repositories, social services, and/or other cloud image repositories).

In some implementations, the computing device 108 connects to the image-related data sources 118 through I/O interfaces to obtain information, such as images stored on the image-related data source 118. After obtaining the images along with the information associated with the images, the computing device 108 processes the data retrieved from the image-related data sources 118 to render one or more images on a web browser using the display 116. The processed and/or the unprocessed information are stored in the image image-related data 114. In various implementations, such information includes but not limited to images, image metadata, image information, geographic information, map information, among others. In some implementations, the database 114 may also store a plurality of record entries relevant to the users 106 associated with the images.

Examples of the image capture device 104 include, but are not limited to, a handheld computer, a wearable computing device, a personal digital assistant (PDA), a tablet computer, a laptop computer, a cellular telephone, a smart phone, an enhanced general packet radio service (EGPRS) mobile phone, a media player, a navigation device, a portable gaming device console, a tablet computer, a laptop computer, a desktop computer, or a combination of any two or more of these data processing devices or other data processing devices.

The image capture device 104 includes (e.g., is coupled to) a display and one or more input devices (e.g., a camera). In some implementations, the image capture device 104 receives inputs (e.g., images) from the one or more input devices and outputs data corresponding to the inputs to the display for display to the user 106. The user 106 uses the image capture device 104 to transmit information (e.g., images) to the computing device 108. In some implementations, the computing device 108 receives the information, processes the information, and sends processed information to the display 116 and/or the display of the image capture device 104 for display to the user 106.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The computing device 108 and/or the server system 120 are implemented on one or more standalone data processing apparatuses or a distributed network of computers. In some implementations, the computing device 108 and/or the server system 120 also employ various virtual devices and/or services of third party service providers (e.g., third-party cloud service providers) to provide the underlying computing resources and/or infrastructure resources.

Figure 2A:
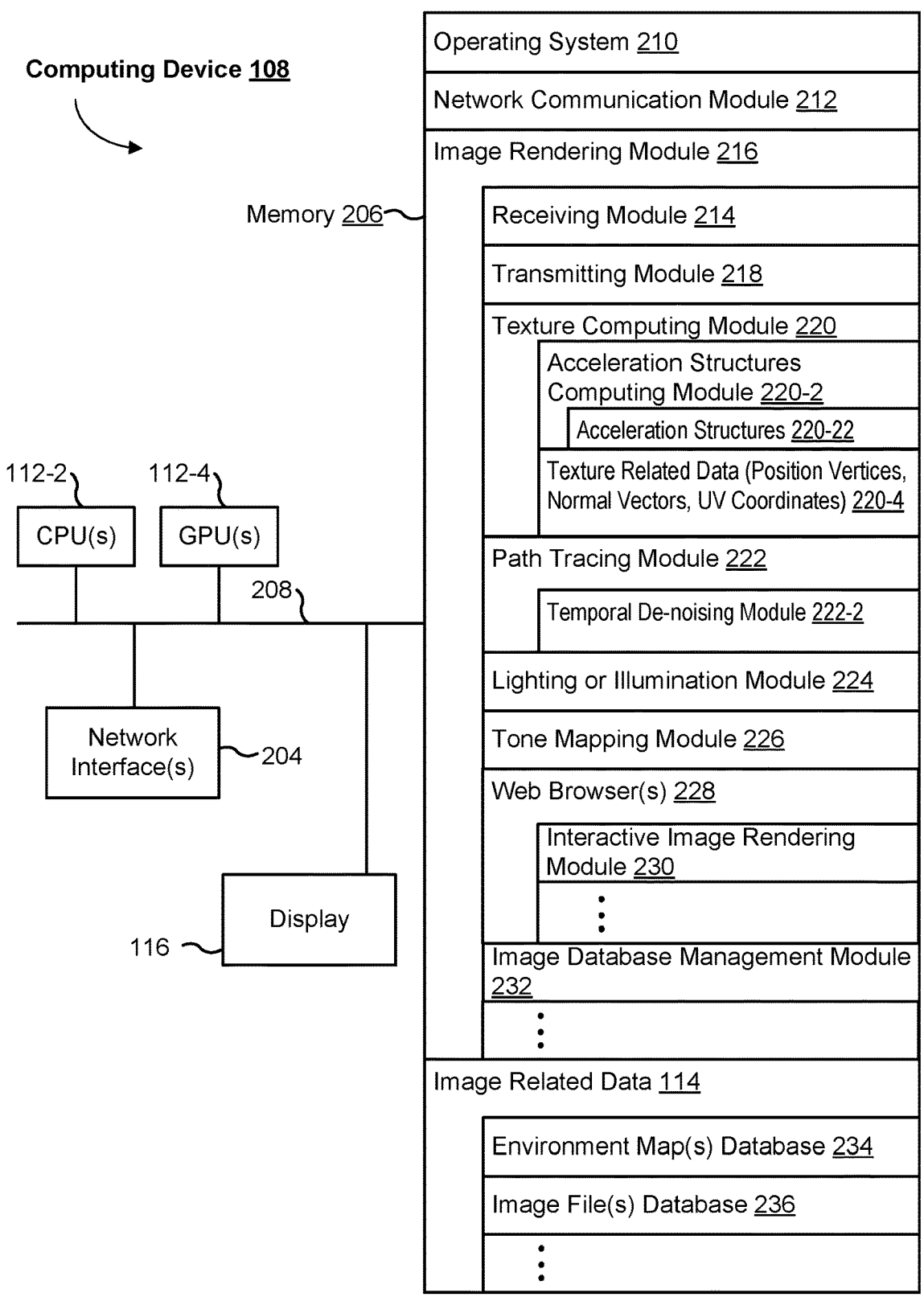
FIG. 2A is a block diagram of a computing device for rendering photorealistic images in a web browser in accordance with some implementations.

FIG. 2 is a block diagram illustrating the computing device 108 in accordance with some implementations. The server system 108 may include one or more processing units (e.g., CPUs 112-2 and/or GPUs 112-4), one or more network interfaces 204, one or more memory units 206, and one or more communication buses 208 for interconnecting these components (e.g. a chipset).

The memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, optionally, includes one or more storage devices remotely located from one or more processing units 112. The memory 206, or alternatively the non-volatile memory within the memory 206, includes a non-transitory computer readable storage medium. In some implementations, the memory 206, or the non-transitory computer readable storage medium of the memory 206, stores the following programs, modules, and data structures, or a subset or superset thereof:

operating system 210 including procedures for handling various basic system services and for performing hardware dependent tasks;

network communication module 212 for connecting the computing device 108 to other computing devices (e.g., image capture devices 104, the server system 120, and/or the image-related data sources 118) connected to one or more networks 110 via one or more network interfaces 204 (wired or wireless);

image rendering module 216, which provides image processing and image rendering in web browsers, includes, but is not limited to:

a receiving module 214 for receiving information related to images. For example, the module 214 handles receiving images from the image capture devices 104, the server system 120, image-related data sources 118, and/or receiving processed images from the GPUs 112-4 for rendering on the display 116;

a transmitting module 218 for transmitting image-related information. For example, the module 218 handles transmission of image-related information to the GPUs 112-4, the display 116, and/or the image capture devices 104;

a texture computing module 220 for computing textures based on the image-related information received by the receiving module 214. In some implementations, the texture computing module 220 executes on the CPU(s) 112-2. In some implementations, the texture computing module includes an acceleration structure (such as a bounding volume hierarchy (BVH) or k-d tree or grid or irregular grid) computing module 220-2 that computes acceleration structure 220-22 data for input images (sometimes called input scenes). In some implementations, the texture computing module 220 also computes texture related data 220-4, such as position vertices, normal vectors, and UV coordinates for the input scene. In some implementations, the texture computing module 220 packages at least the acceleration structure data 220-22, and the texture-related data 220-4 to a texture map which is transmitted to the GPU(s) 112-4 for sampling;

a path tracing module 222 that generates samples of images using path tracing. In some implementations, the path tracing module 222 includes a temporal noise reduction module 222-2 (sometimes called temporal denoising module). Operations of the module 222-2 are described below in reference to FIGS. 6 and 7A-7F, according to some implementations;

a lighting or illumination module 224 that adds lighting or illumination to images sampled by the path tracing module 222;

a tone mapping module 226 to tone map an output of the lighting or illumination module 224 and/or the path tracing module 222; and one or more web browsers 228 that include interactive image rendering modules 230 (e.g., WebGL); and one or more server database of image-related data 114 storing data for image processing and/or rendering images, including but not limited to:

a database 234 that stores one or more environment maps;

a database 236 that stores image files;

though not shown in FIG. 2, a temporary container to temporarily store full size images during image transfer.

In some implementations, an image database management module 232 manages multiple image repositories, providing methods to access and modify image-related data 114 that can be stored in local folders, NAS or cloud-based storage systems. In some implementations, the image database management module 232 can even search offline repositories. In some implementations, offline requests are handled asynchronously, with large delays or hours or even days if the remote machine is not enabled. In some implementations, the image catalog module 232 manages permissions and secure access for a wide range of databases.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 2B:
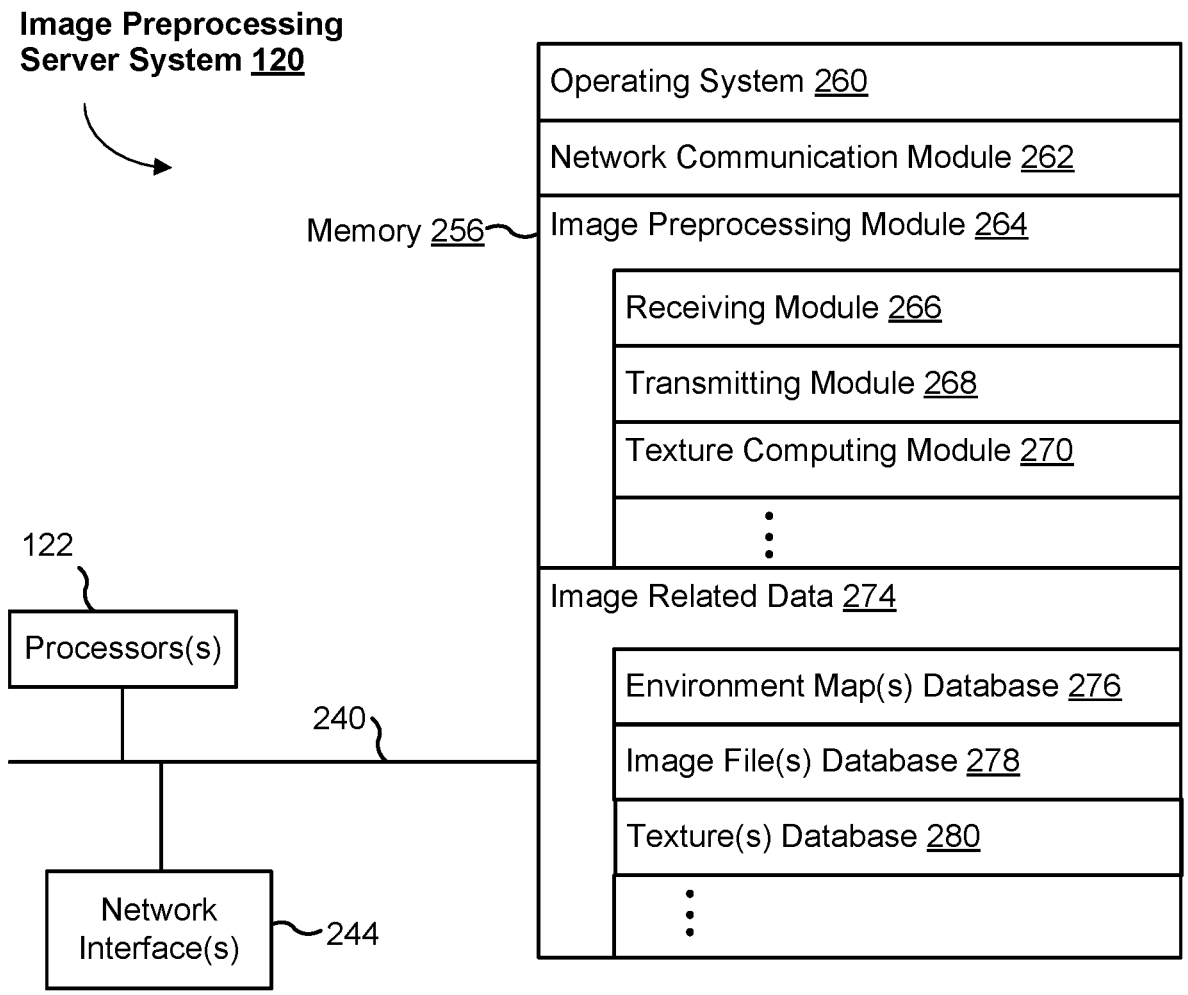
FIG. 2B is a block diagram of an image preprocessing server system in accordance with some implementations.

FIG. 2B is a block diagram illustrating a representative image preprocessing server system 120 in accordance with some implementations. A server system 130, typically, includes one or more processing units (e.g., CPUs and/or GPUs) 122, one or more network interfaces 244, memory 256, optionally one or more sensors, and one or more communication buses 240 for interconnecting these components (sometimes called a chipset).

Memory 256 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 256, optionally, includes one or more storage devices remotely located from one or more processing units 122. Memory 256, or alternatively the non-volatile memory within memory 256, includes a non-transitory computer readable storage medium. In some implementations, memory 256, or the non-transitory computer readable storage medium of memory 256, stores the following programs, modules, and data structures, or a subset or superset thereof:

operating system 260 including procedures for handling various basic system services and for performing hardware dependent tasks;

network communication module 262 for connecting the image preprocessing server system 120 to other computing devices (e.g., the computing device 108 and image-related data sources 118) connected to one or more networks 110 via one or more network interfaces 244 (wired or wireless);

image preprocessing module 264 for preprocessing images received from the image capturing devices 104 and/or the image-related data sources 118, including:

receiving module 266 to receive image-related information (similar to the receiving module 214);

transmitting module 268 to transmit image-related information (similar to the transmitting module 218); and texture computing module 270 to compute textures based on image-related information;

one or more server database of image-related data 274 storing data for image processing and/or rendering images, including but not limited to:

a database 276 that stores one or more environment maps;

a database 278 that stores image files; and a database 280 for storing computed textures.

FIGS. 3A-3K provide a flowchart of a method 300 for rendering photorealistic images in a web browser in accordance with some implementations. The method renders photorealistic images in a web browser. The method 300 is performed in a computing device (e.g., the device 108) having a general purpose processor (e.g., the CPU(s) 112-2) and a graphics processing unit (GPU) (e.g., the GPU(s) 112-4).

The method 300 includes obtaining (302) an environment map (e.g., a high dynamic range image (HDRI)) that includes illumination values, positional vectors and transforms of an environment. For example, the computing device 108 uses the receiving module 214 to receive environment map(s) into or from the environment database 234.

Sometimes called a world map, an environment map is the depiction of the world as received from a camera, such as equilateral maps, high dynamic range images or 360 degree spherical maps used as light sources. In some implementations, it is the depiction of the world as tracked at a given moment. This includes various positional vectors and transforms of detected objects like point clouds, anchors, planes etc. In some implementations, the camera has the ability to serialize the world map to disk and reload it subsequently to recreate the world. This is useful for gaming applications, for example, if a user receives a phone call and has to background the app or in multiplayer game scenarios. Some implementations use the world map to detect and place custom anchors and planes for 3D modeling purposes. For example, the world map is used to change relative positions of occlusions to a building façade, walls, furniture, etc. Some implementations extend the map to also include lighting conditions and combine the map with the images to create a comprehensive snapshot of the world at the point the image was captured. In some implementations, the environment map is computed offline (e.g., by the preprocessing server system 120). In some implementations, the environment map is computed based on an image captured by a user (e.g., the user 106) of the camera (e.g., the image capture device 104-1) who captures the scene.

Figure 3A:
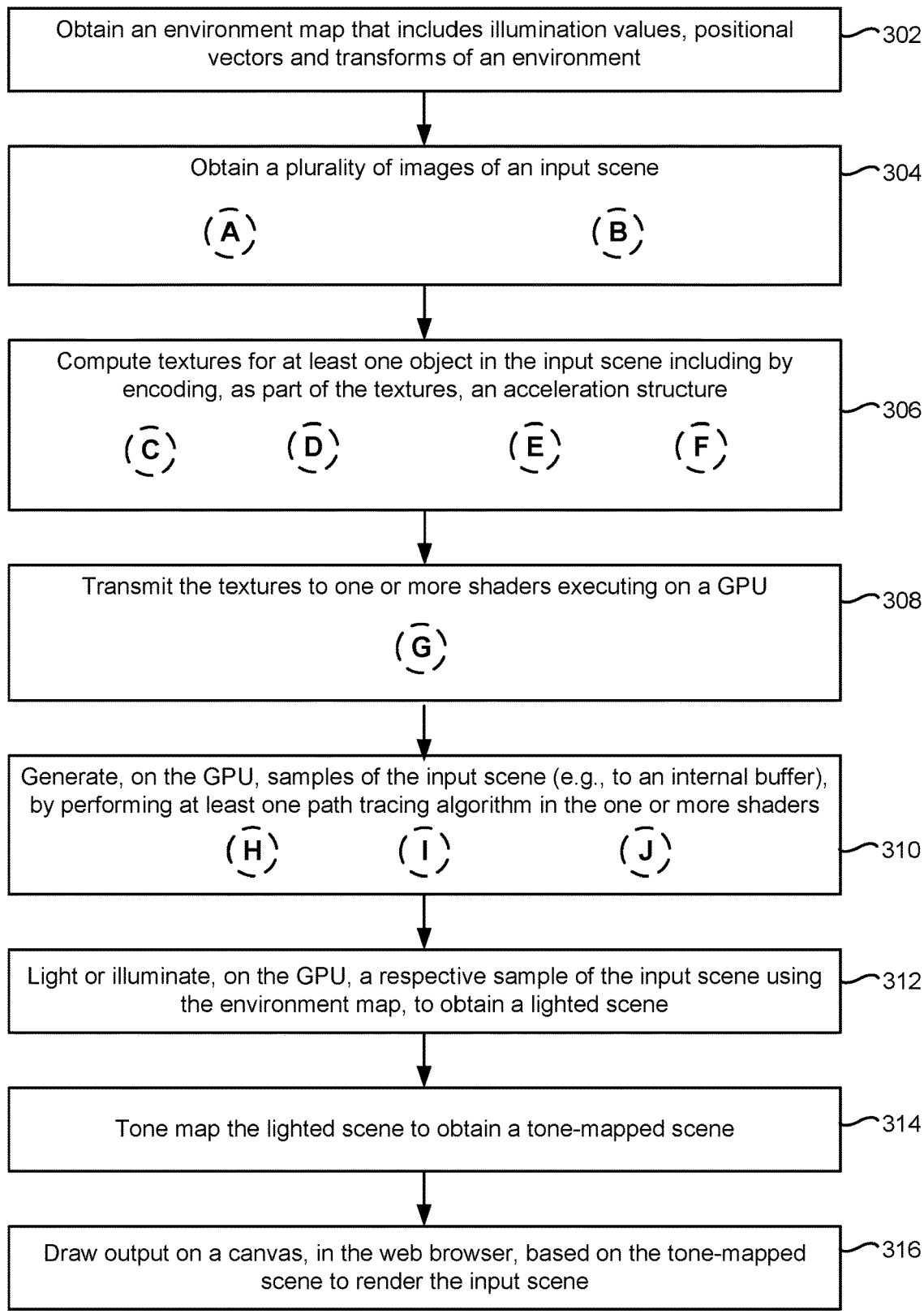
FIGS. 3A-3K provide a flowchart of a method for rendering photorealistic images in a web browser in accordance with some implementations.
Figure 3B:
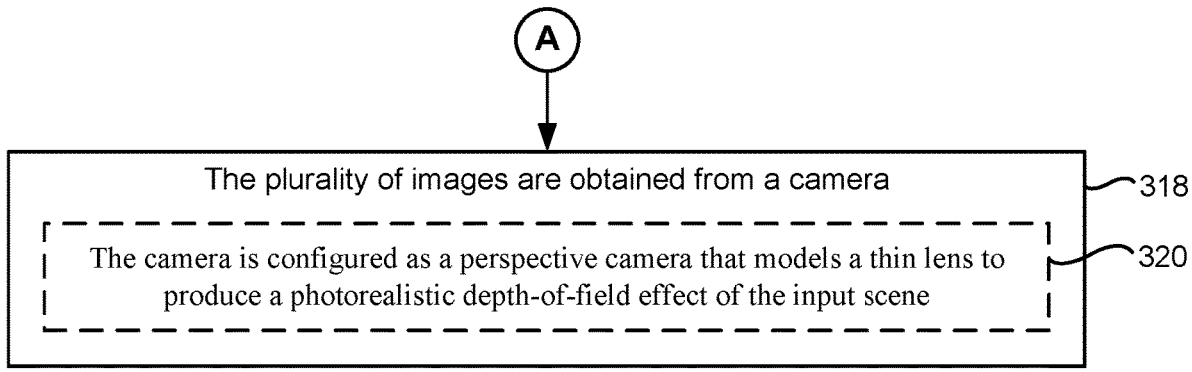

The method 300 also includes obtaining (304) at least one image of an input scene. Sometimes a scene is referred to as an image. In some implementations, a scene refers to a static scene (a scene that does not change) as opposed to a dynamic scene. Referring to FIG. 3B, in some implementations, the at least one image are obtained (318) from a camera (e.g., the image capture device 104-1). In some implementations, the camera's position can change with respect to the scene to capture a plurality of images of the scene. In some implementations, the camera is configured (320) as a perspective camera that models a thin lens to produce a photorealistic depth-of-field effect of the input scene. In some implementations, the opening of the lens is specified by a user—higher values result in less depth of field and more blurring for objects outside the focal point. Some implementations use a default value of the opening (e.g., 0.01). In some implementations, a user specifies focus of the camera as a number (the distance to the focal point). Objects further away from this distance are likely to be out of focus. Some implementations use a default value (e.g., 10) for the camera focus. In some implementations, the at least one image is derived from at least one aerial image or oblique capture.

Figure 3C:
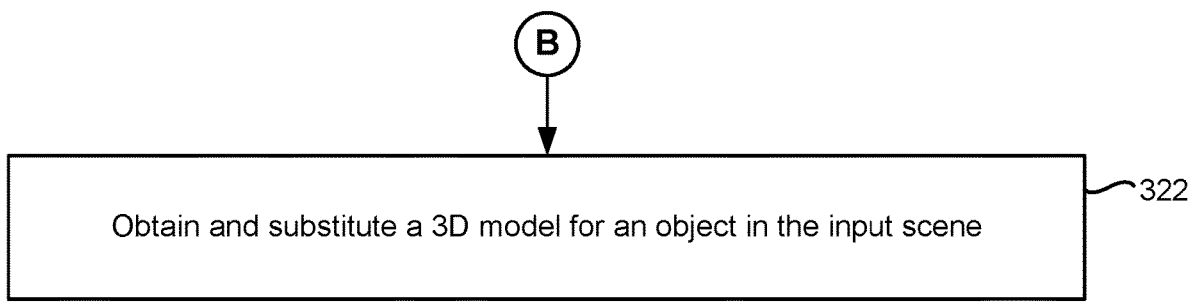

Referring to FIG. 3C, in some implementations, the method 300 includes obtaining and substituting (322) a 3D model for an object (e.g., a building) of the input scene.

Referring back to FIG. 3A, the method 300 includes computing (306) textures for the input scene. This step includes encoding, as part of the textures, an acceleration structure. In some implementations, an acceleration structure is generated as a series of nodes comprising a bounding volume hierarchy (BVH) of the input scene (or triangle meshes of the input scene). In some implementations, the acceleration structure is an irregular grid.

Figure 3D:
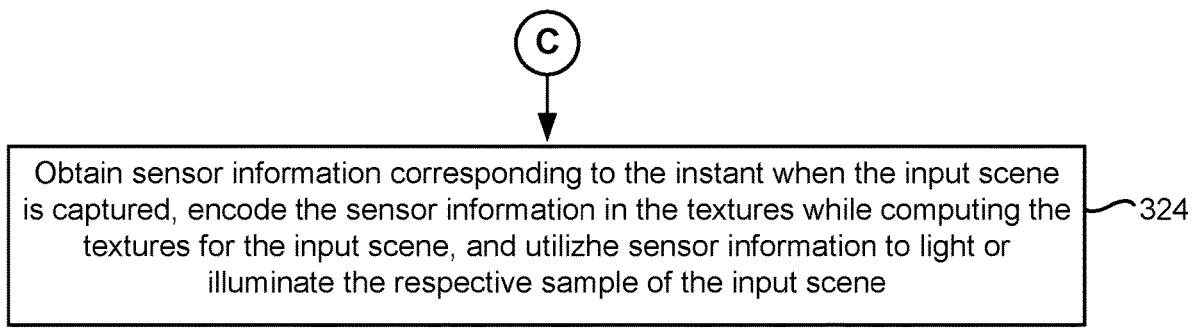

Referring next to FIG. 3D, in some implementations, the method 300 includes obtaining (324) sensor information (e.g., relative position with respect to the scene, lighting, ambient and directional, color temperature) corresponding to the instant when the input scene is captured, encoding the sensor information in the textures while computing the textures for the input scene, and utilizing the sensor information to light or illuminate the respective sample of the input scene.

Figure 3E:
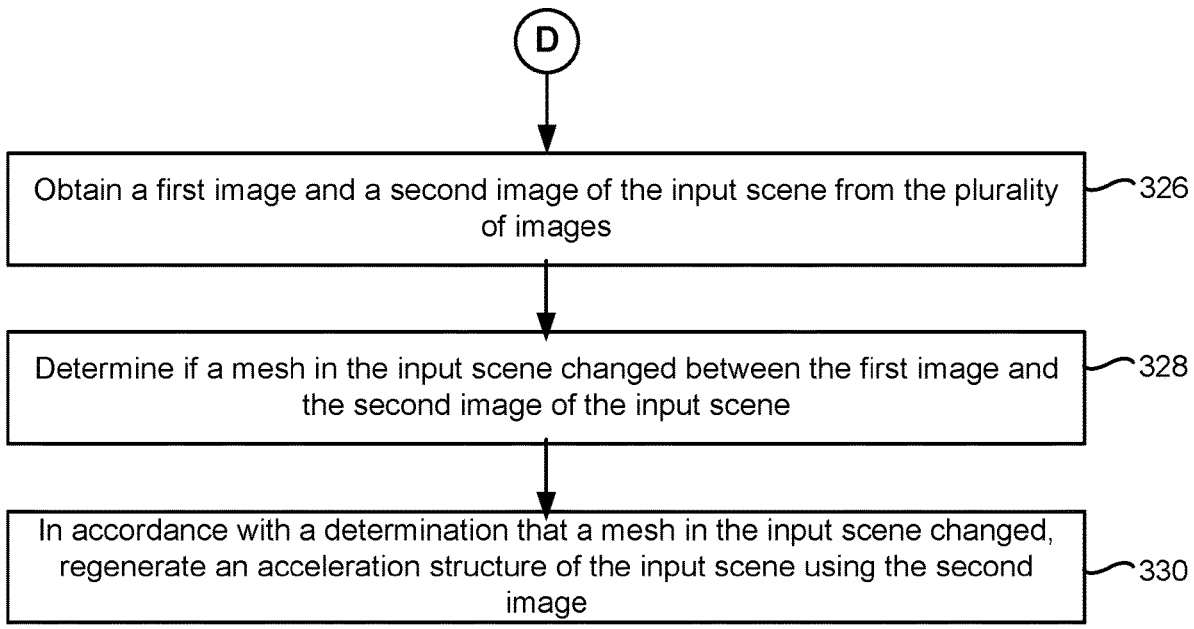

Referring next to FIG. 3E, in some implementations, the method 300 further includes obtaining (326) a first image and a second image of the input scene, and determining (328) if a mesh in the input scene changed between the first image and the second image of the input scene. For example, because the camera changed position, a mesh, material, or a geometry of the scene has changed relative to the camera's new orientation to the scene. In accordance with a determination that a mesh in the input scene changed, the method 300 includes regenerating (330) (e.g., re-computing or updating) the acceleration structure of the input scene using the second image. In some implementations, regenerating (330) comprises selecting and computing a new acceleration structure of the input scene.

Figure 3F:
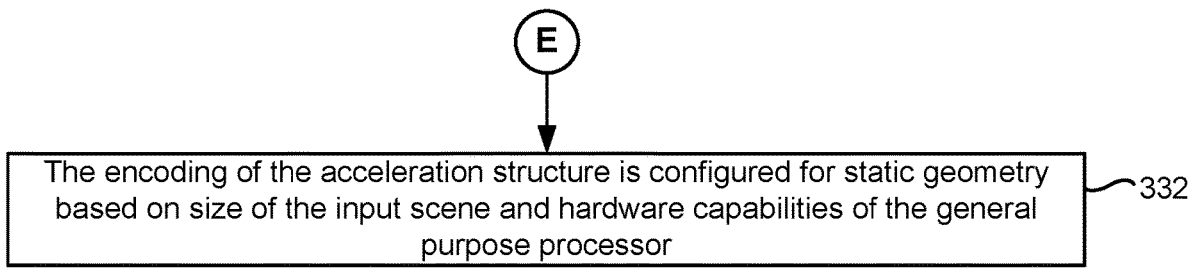

Referring next to FIG. 3F, in some implementations, the encoding of the acceleration structure is limited to static geometry based on size of the input scene and hardware capabilities of the general purpose processor. Depending on the size of the input scene and the hardware capabilities, the acceleration structure can sometimes take over a second to construct. Some implementations restrict the acceleration structure construction to static geometry in order to achieve interactive framerates. In some implementations, frame rates above 60 fps are implemented for static scenes.

Figure 3G:
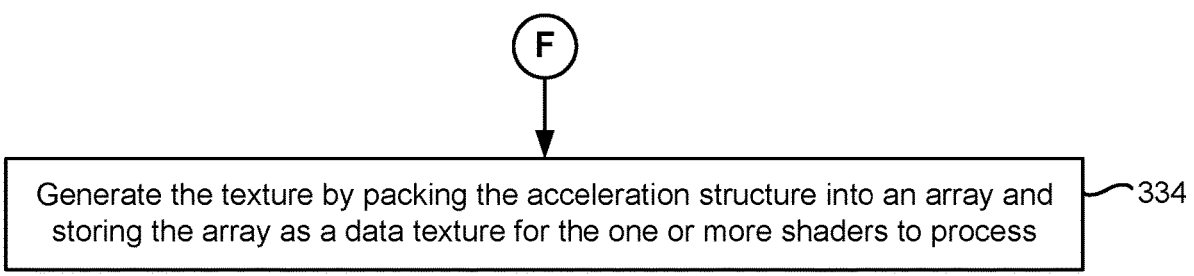

Referring next to FIG. 3G, in some implementations, generating (334) the texture includes packing the acceleration structure (e.g., a BVH) into an array and storing the array as a data texture for the one or more shaders (e.g., a fragment shader running on a GPU) to process.

Figure 3H:
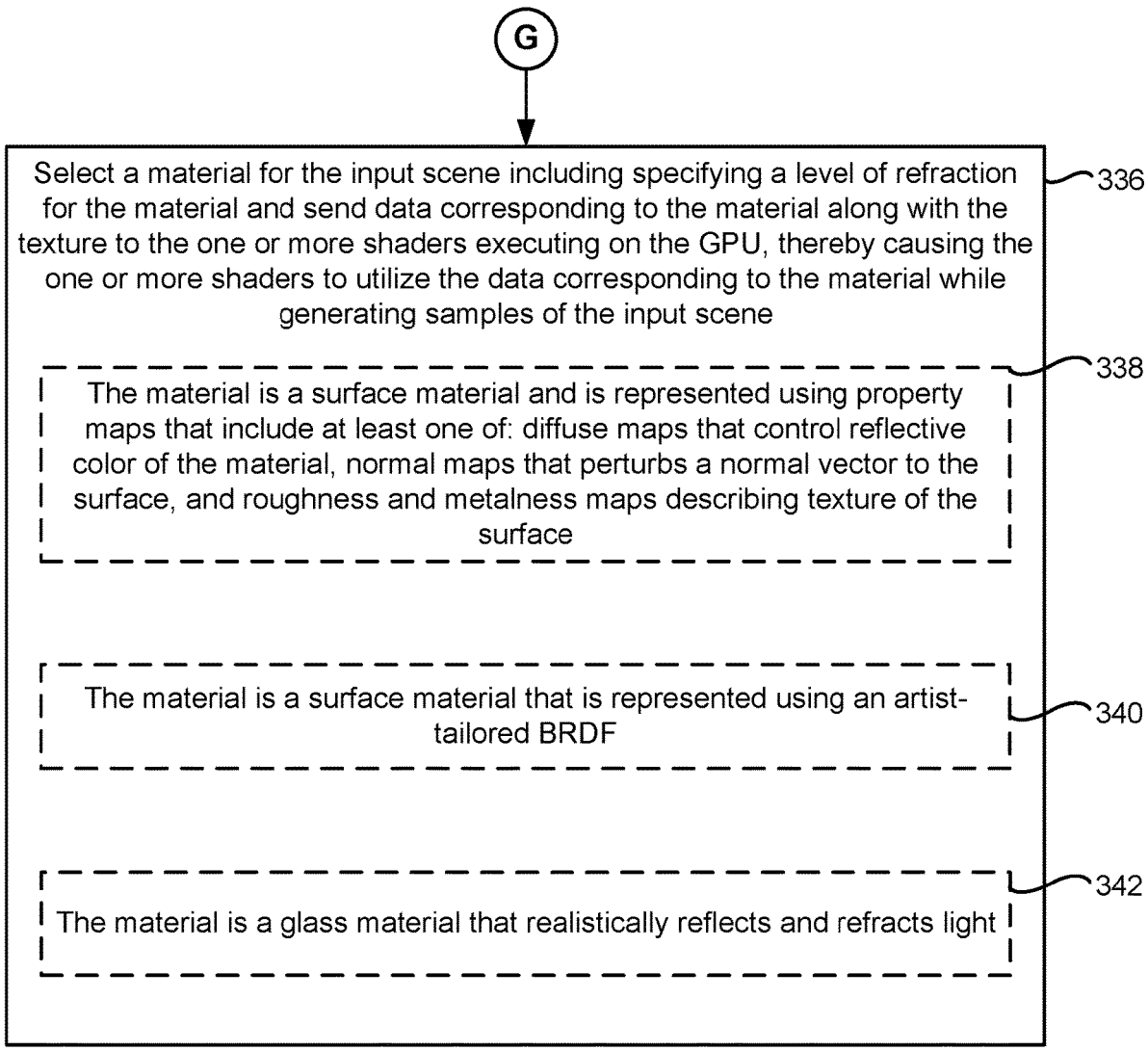

Referring next to FIG. 3H, in some implementations, the method 300 further includes selecting (336) a material for the input scene including specifying a level of refraction for the material, and sending data corresponding to the material along with the texture to the one or more shaders executing on the GPU, thereby causing the one or more shaders to utilize the data corresponding to the material while generating samples of the input scene. For surface materials, some implementations support a standard Physically Based Rendering (PBR) workflow, including UV mapping. A standard PBR workflow model includes a roughness parameter and a metalness parameter, both of which can be adjusted or specified by a user. These two parameters are used by any PBR material.

For transparent materials such as glass, a traced ray will undergo reflection and refraction. The reflected portion is sampled in accordance with the Fresnel principle that grazing angles of light are perceived brighter, and importance sampling will bias these angles. Refracted portions will transmit into the material based on a refractive index value (for example, glass's index of refraction is approximately 1.6) and out of the material in a similar fashion in accordance with Snell's law. Rays that transmit through a transparent material will therefore laterally shift in proportion to the thickness of the material. The severity of the shift will dictate which pixels of a surface along the path after transmission through the transparent material are illuminated by the refracted ray. In some implementations, where the input scene comprises a manmade structures with windows, the thickness of the windows is set at an industry standard (for example, most windows for residential uses are between 2 mm and 6 mm thick) with 4 mm as a default thickness. Some implementations use a thick glass or thin glass as the material (thus extending the standard workflow). Additionally, some implementations also support a shadow catcher material which only captures shadows, without casting its own light. In some implementations, materials in shadow portions (of an input scene) are assumed to not transmit indirect light. In some implementations, a shadow catcher material is used to blend model into background light.

A shadow catcher is a transparent material that only renders shadows cast onto it. Conventional renderers are limited in the ability to render a shadow catcher. For example, some renderers cannot render a shadow catcher that also contains global illumination. Some renderers cannot render a shadow catcher on a transparent material that displays the correct brightness of shadows. Some implementations address these issues by rendering a modified version of a realistic micro-facet material so that the end result contains correct shadows, global illumination, and reflections, all on an otherwise transparent surface. In some implementations, the shadow catcher is rendered as a modified version of a standard material that contains a diffuse and specular component. In some implementations, the material's albedo is computed dynamically by a color of the environment map behind the surface (e.g., position in the environment map where the camera is pointing at). In other words, the degree an intermediate object, such as a rendered object surface or a transparent material of the shadow catcher, reflects other colors can be dynamically calculated by determining the color of the environment map the camera observes which serves as a proxy for the light path parameters at that camera pose. Then the material is sampled via path tracing into the RGB channels of the light buffer.

Some implementations also render a sample of the material without shadows. For this sample, some implementations use a white albedo value. In some implementations, the unshadowed version is converted from colored to grayscale by computing its relative luminance. Then this grayscale light is multiplied into the alpha channel of the light buffer. The alpha channel starts each light path equal to 1.0 until the shadow catcher multiplies the unshadowed light into it. In some implementations, each sample rendered is accumulated and summed into the light buffer. This includes the alpha channel.

During a post-processing step, some implementations divide the RGB channels by the alpha channel. With the default alpha value of 1 per sample, this process produces the average light accumulation of the light buffer. But with the shadow catcher, this process produces the average light accumulation and divides the shadowed light by the unshadowed light. In this way, some implementations cancel out all contributions of light on the material and leave only the shadow contribution. In some implementations, subsequently, the color is rendered to a screen, and the end result is a transparent material that only displays shadows cast onto it.

Multiplying the alpha by the unshadowed light affects any light added from a previous bounce in the light path. To counteract this, when multiplying the alpha by the unshadowed light, some implementations also multiply the light of the existing path by the same amount. In the post-processing step, the division cancels out the multiplication for everything prior to the shadow catcher at this point in the path.

In some implementations, mesh vertices and material map (corresponding to the input scene) are stored in the data textures and transmitted to the shaders. In some implementations, the memory footprint for the texture data for a scene is within the GPU memory limits (e.g., within the VRAM limits). The typical memory requirements for real-time (or interactive) rendering of scenes are within the memory limitations of modern GPUs.

In some implementations, the material is a surface material and is represented (338) using property maps that include at least one of: diffuse maps that control reflective color of the material, normal maps that perturbs (sometimes referred to as modulating) a normal vector to the surface, and roughness and metalness maps describing texture of the surface. In some implementations, a normal vector represents a vector orthogonal to a mesh triangle, and the perturbing or modulation refers to an artificial way to vary its appearance relative to an adjacent triangle of the same material. For flat materials like aluminum, siding the normal vectors between adjacent triangles should be near-parallel and two adjacent mesh triangles should appear similar, but for materials that are rough (e.g., stucco), by perturbing triangle's normal vectors, additional roughness can be perceived, because the BRDF for that material will not produce substantially identical samples within a common region.

In some implementations, the material is a surface material that is represented (340) using an artist-tailored bidirectional reflectance distribution function (BRDF), such as Disney's Principled BRDF that adequately describes the majority of surfaces on earth while at the same time remaining consistent with PBR workflows in existing 3D software (e.g., Three.js).

In some implementations, the material is (342) a glass material that realistically reflects and refracts light. Some implementations model the glass to be perfectly smooth, which is not necessarily true of glass in real life. This assumption improves rendering performance and sufficiently applies to most real-world examples of glass. "Realistic" means it satisfies the Fresnel equation, which dictates that reflective surfaces, such as glass, are more reflective in grazing angles and more refractive otherwise.

Referring back to FIG. 3A, the method includes transmitting (308) the textures to one or more shaders executing on a GPU (or a co-processor distinct from the general purpose processor where the acceleration structure is computed).

The method also include generating (310), on the GPU, samples of the input scene, by performing at least one path tracing algorithm in the one or more shaders according to the textures. In some implementations, the method further includes storing the results of the at least one path tracing algorithm in an internal buffer.

The method also includes lighting and/or illuminating (312), on the GPU, a respective sample of those portions within an acceleration structure of the input scene using the environment map, to obtain a lighted scene. For example, the 3D scene is illuminated from all directions by the environment map placed on an infinitely-large sphere (warped) around the scene.

The method also includes tone mapping (314) the lighted scene to obtain a tone-mapped scene. Some implementations tone map the texture (e.g., a HDR texture) so that the lighted scene may be displayed on a monitor. Some implementations employ a variety of standard tone map operators input by a user. The method further includes drawing (316) output on a canvas, in the web browser, based on the tone-mapped scene to render the input scene (e.g., by copying the currently rendered scene from the internal buffer).

In some implementations, the one or more shaders traverse the BVH using a stack-based algorithm. Although there are several stackless BVH traversal algorithms that work well with the GPU, and even though such algorithms have smaller memory footprint, the traditional stack-based approach results in a simpler implementation. Moreover, any conventional (even low-powered device) that runs the ray-tracing algorithm typically has sufficient memory for a stack-based algorithm.

Figure 3I:
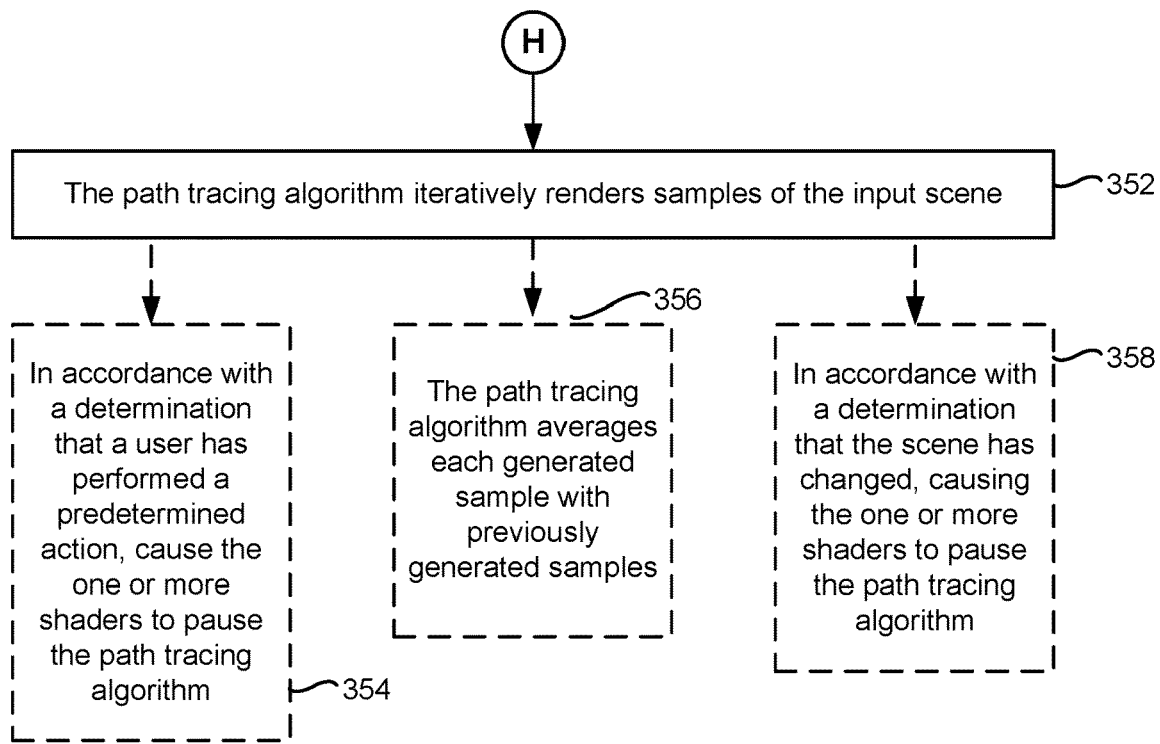

Referring next to FIG. 3I, in some implementations, the at least one path tracing algorithm iteratively (or progressively) renders (352) samples (or triangle meshes of the samples) of the input scene. Typically, more iterations or more samples generally results in higher quality images.

In some implementations, in accordance with a determination that a user has performed a predetermined action (e.g., when browser window is off focus or when a user clicks away from the browser window or switches to a different tab on the browser), the method includes causing (354) the one or more shaders to pause the at least one path tracing algorithm or restart the sampling loop. In some implementations, the shaders change from a first rendering resolution time (measured as million rays/second or Mray/s) to a second rendering resolution time when the user selects an active browsing pane other than the one rendering the object.

In some implementations, the at least one path tracing algorithm averages (356) each generated sample with previously generated samples.

In some implementations, the method further includes, in accordance with a determination that the scene (or a position of the camera) has changed, causing the (358) one or more shaders to pause the at least one path tracing algorithm (or restart the sampling loop).

Figure 3J:
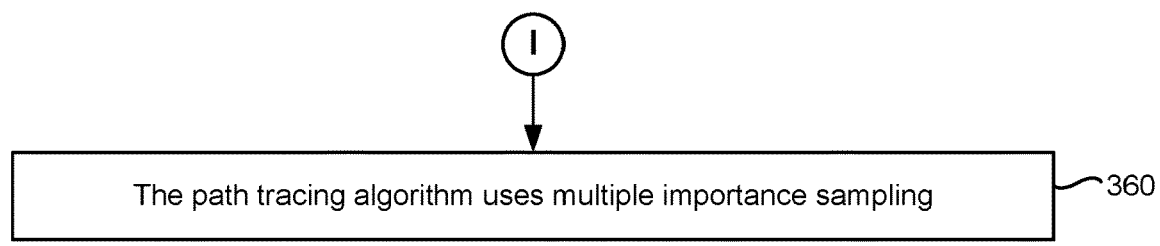

Referring next to FIG. 3J, in some implementations, the at least one path tracing algorithm uses (360) multiple importance sampling. In some implementations, the path at least one path tracing algorithm is a cumulative distribution function of the environment map. In some implementations, the lighting or illumination multiple importance samples the input scene using the cumulative distribution function of the environment map averaged with a bidirectional reflectance distribution function of a material of the input scene. As a way of explanation, a single light ray incident upon real world objects will, in general, diffuse or scatter into a plurality of rays. Given the large number of rays that may be incident upon any one object, or in computer graphics the large number of rays that are incident upon a given pixel depicted in an object, the multiplied diffuse rays create millions of potential paths to trace for accurate rendering. In some situations, selecting those rays among the many for rendering via path tracing introduces large statistical variance to the rendered image. To reduce the interminable amount of time to calculate all possible rays, and choose those that minimize variance of appearance, importance sampling instead selects those rays more likely to have an effect on the overall appearance of a pixel. Some implementations importance sample the material according to the BRDF of the respective material, to optimize certain angles of incident light relative to the normal vector for a triangle. In some implementations the material is importance sampled for the cumulative distribution function (CDF) of the environmental map. Whereas other techniques in the art employ a probability distribution function to importance sample rays to a random light source (PDF), using a cumulative distribution function weighs the contribution of the brightest portion of the environment map more heavily. For outdoor scenes, where the brightest light source may be presumed to be sunlight, CDF utilization properly favors the primary light source without consideration to proximity or area projection proportion of illumination from other light sources.

Figure 3K:
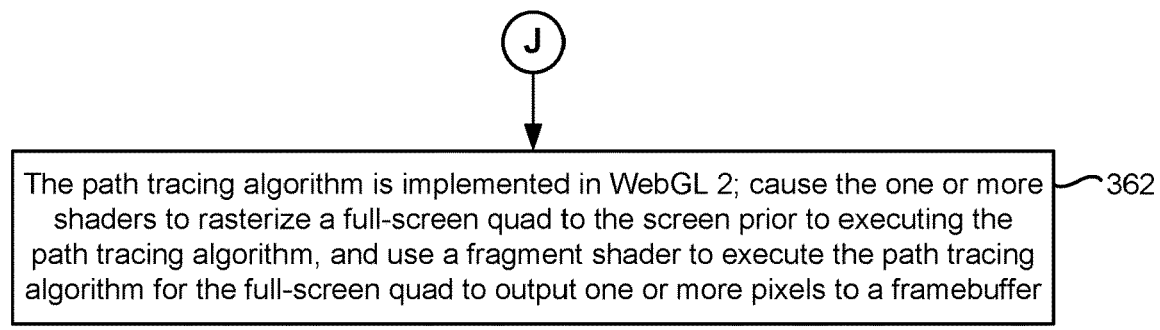

Referring next to FIG. 3K, in some implementations, the at least one path tracing algorithm is implemented in Web GL, and in preferred implementations on WebGL 2, and the method further includes, causing (362) the one or more shaders to rasterize a full-screen quad to the screen prior to executing the at least one path tracing algorithm, and using a fragment shader to execute the at least one path tracing algorithm for the full-screen quad to output one or more pixels to a framebuffer.

In some implementations, geometry buffers such as z-buffers for the input scene discard those rays that are occluded from the brightest light source and instead rely solely on BRDF importance sampling. Otherwise, multiple importance sampling averages the values of the bilinear rays (as determined among the BRDF and the CDF) to provide a combined resultant light intensity for that portion of the surface. It will be appreciated that importance sampling increases the rate at which variance decreases when rendering samples. This technique of multiple importance sampling enables some implementations to use environment maps with contrasted or highly varied sources of light, and effectively renders the scene in areas that are both in sunlight or in shadow.

As described above, in some implementations, each sample is rendered to an internal buffer. Subsequent operations store to and retrieve from the internal buffer. Some implementations store resulting render in a floating-point HDR texture in order to realistically represent the widely varying levels of reflected light present in a scene.

In some implementations, the method further includes predicting a cost of material required to build the plurality of objects in the environment according to the rendering (e.g., based on measurements, a predicted overall cost for the 3D structure for the conditions).

In some implementations, computing the textures for the input scene is performed on the general purpose processor, and the computing device is a low-power device that does not have a high-speed Internet connection (e.g., to perform the computations on a cloud infrastructure).

Some implementations render a photorealistic 3D model in a completely different display environment and a different point in time. Some implementations render such photorealistic images on a desktop browser, while also providing nearly the same visual experience on a phone (for example, when a viewer chooses to view a building structure via its 3D model in lieu of the actual building). Some implementations make material predictions and provide additional measurement information based on the collected data (e.g., as part of a separate estimation order service or application).

Figure 4:
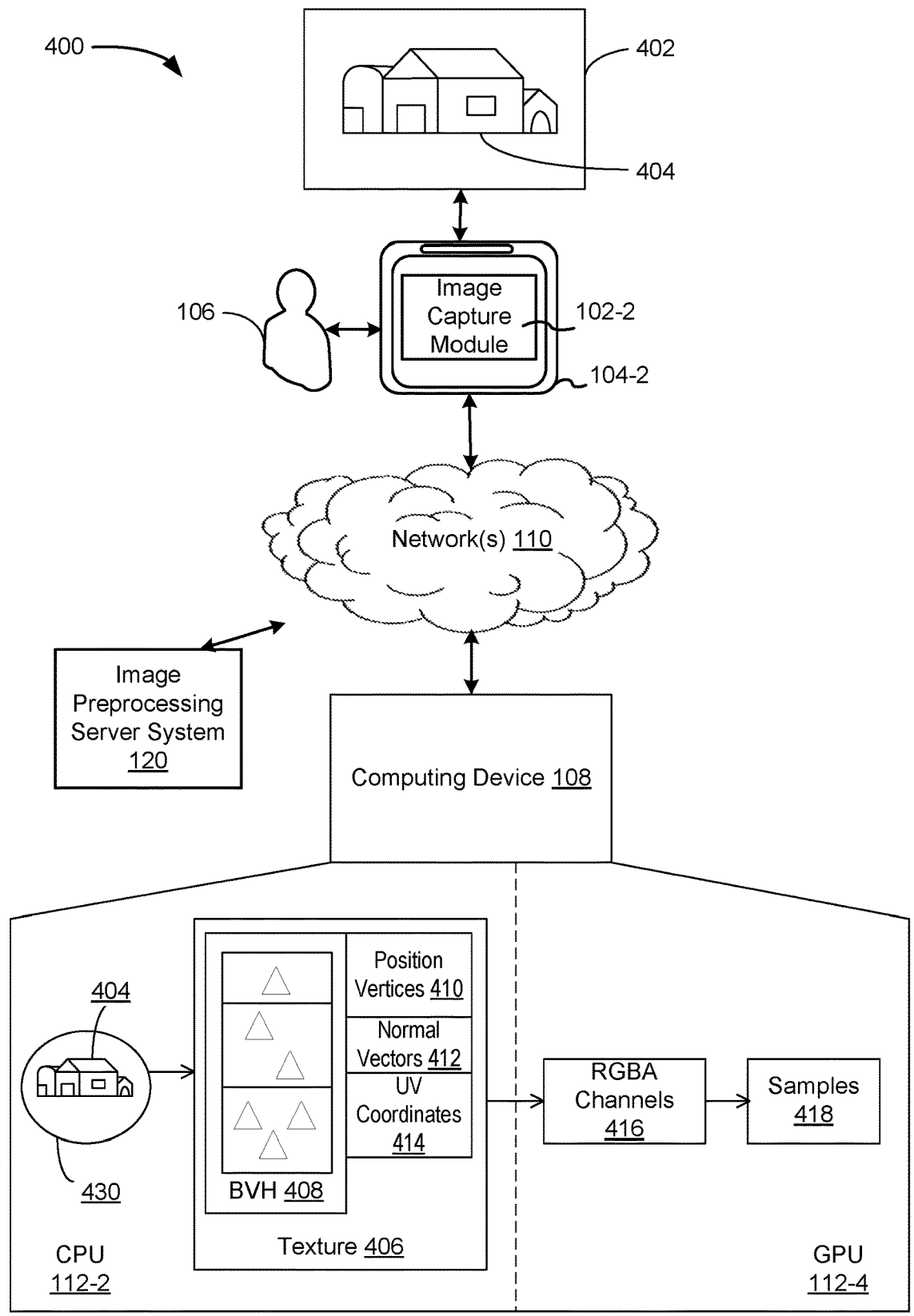
FIG. 4 is a block diagram of a computing system for accelerating rendering of graphical images using a GPU in accordance with some implementations.

FIG. 4 is a block diagram of a computing system 400 for accelerating rendering of graphical images using a GPU in accordance with some implementations. In some implementations, the computer system 400, similar to the computer system 100 described above in reference to FIG. 1, includes at least an image capture module 102-2 executed on an image capturing device 104-2, and a computing device 108.

The image capturing module 102-2 communicates with the computing device 108 through one or more networks 110, as described above in reference to FIG. 1. The image capturing module 102-2 provides image capture functionality (e.g., take photos of images, such as the image 402 with one or objects, such as the building 404) and communications with the computing device 108. In some implementations, although not shown, an image preprocessing server system 120 (as described above in reference to FIG. 1) provides server-side functionality (e.g., preprocessing images, such as creating textures, storing environment maps and images and handling requests to transfer images) for the image capture module 102-2 residing on the image capture device 104-2.

In some implementations, the image capture device 104-2 is a computing device, such as a desktop, laptop, a mobile device, and a camera, from which users 106 can capture images (e.g., take photos), discover, view, edit, and/or transfer images.

In some implementations, the computer system 400 shown in FIG. 4 includes both a client-side portion (e.g., the image capture module 102-2 and modules on the computing device 108) and a server-side portion (e.g., a module in the server system 120). In some implementations, data preprocessing is implemented as a standalone application installed on the computing device 108 and/or the image capture device 104-2. In addition, the division of functionality between the client and server portions can vary in different implementations. For example, in some implementations, the image capture module 102-2 is a thin-client that provides only image search requests and output processing functions, and delegates all other data processing functionality to a backend server (e.g., the server system 120). In some implementations, the computing device 108 delegates image processing functions to the server system 120.

The communication network(s) 110 can be any wired or wireless local area network (LAN) and/or wide area network (WAN), such as an intranet, an extranet, or the Internet. It is sufficient that the communication network 110 provides communication capability between the server system 120, one or more image capture devices (e.g., the device 104-2), (optionally) image-related data sources, and/or the computing device 108.

In some implementations, as described above in reference to FIG. 1, the computing device 108 includes one or more processors 112 (e.g., the CPU 112-2 and the GPU 112-4), one or more image related databases 114, and a display 116. Although not shown, in some implementations, the computing device 108 further includes one or more I/O interfaces that facilitate the processing of input and output associated with the image capture devices 104 and/or the server system 120. One or more processors 112 obtain images and information related to images from image-related data sources 118 (e.g., in response to a request to render an image on a web browser), processes the images and related information, and stores the image references along with the information in the image related database 114. The image-related database 114 stores various information, including but not limited to catalogs, images, image metadata, image information, geographic information, map information, among others. The image-related data 114 may also store a plurality of record entries relevant to the users associated with images. I/O interfaces facilitate communication with one or more image-related data sources 118 (e.g., image repositories, social services, and/or other cloud image repositories).

In some implementations, the computing device 108 connects to the image-related data sources 118 through I/O interfaces to obtain information, such as images stored on the image-related data source 118. After obtaining the images along with the information associated with the images, the computing device 108 processes the data retrieved from the image-related data sources 118 to render one or more images on a web browser using the display 116. The processed and/or the unprocessed information are stored in the image image-related data 114. In various implementations, such information includes but not limited to images, image metadata, image information, geographic information, map information, among others. In some implementations, the database 114 may also store a plurality of record entries relevant to the users 106 associated with the images.

Examples of the image capture device 104-2 include, but are not limited to, a handheld computer, a wearable computing device, a personal digital assistant (PDA), a tablet computer, a laptop computer, a cellular telephone, a smart phone, an enhanced general packet radio service (EGPRS) mobile phone, a media player, a navigation device, a portable gaming device console, a tablet computer, a laptop computer, a desktop computer, or a combination of any two or more of these data processing devices or other data processing devices.

In some implementations, the image capture device 104-2 includes (e.g., is coupled to) a display and one or more input devices (e.g., a camera). In some implementations, the image capture device 104 receives inputs (e.g., the image 404) from the one or more input devices and outputs data corresponding to the inputs to the display for display to the user 106. The user 106 uses the image capture device 104 to transmit information (e.g., images) to the computing device 108. In some implementations, the computing device 108 receives the information, processes the information, and sends processed information to the display 116 and/or the display of the image capture device 104 for display to the user 106.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

As described above in reference to FIG. 1, in some implementations, the computing device 108 and/or the server system 120 are implemented on one or more standalone data processing apparatuses or a distributed network of computers. In some implementations, the computing device 108 and/or the server system 120 also employ various virtual devices and/or services of third party service providers (e.g., third-party cloud service providers) to provide the underlying computing resources and/or infrastructure resources.

In some implementations, as shown in FIG. 4, the computing device 108, extracts, using a CPU 112-2, information 430 (e.g., triangle meshes) on one or more objects (e.g., the building 404) in the input image 402 (sometimes called an input scene). The computing device 108 generates, using the CPU 112-2, a bounding volume hierarchy (BVH) 408 based on the information 430. For example, the BVH computing module 220-2 generates a hierarchy of bounding volumes after sub-dividing the input scene input into regions or bounding volumes and associating each triangle with a respective region. The computing device 108 also generates, using the CPU 112-2, one or more texture related data (e.g., the data 220-4), such as position vertices 410, normal vectors 412, and UV coordinates 414, for the input scene. The computing device 108 subsequently generates, using the CPU 112-2, a texture 406 (e.g., using the texture computing module 220, FIG. 2) for the input scene by packaging at least the BVH data 408, the position vertices 410, the normal vectors 412, and the UV coordinates 414, according to some implementations. The texture 406 is transmitted to the GPU 112-4 which extracts RGBA channels 416 from the texture 406, and generates samples 418 for the input scene 402 according to the RGBA channels 416, according to some implementations.

Some implementations store image-related data inside a data structure, such as a texture map, that can then be efficiently manipulated on the GPU. Some implementations store position vertices of every mesh, normal vectors of every mesh, UV coordinates of every mesh, and/or BVH data structure representing the input scene. Some implementations encode (or package) and upload (or transmit) information to the GPU as follows. Some implementations start with an 1-dimensional array of size n, and create a floating point RGBA WebGL texture. The precision is set to either 16-bits (g1.RGBA16F) or 32-bits (g1.RGBA32F) depending on whether memory or precision is optimized. For example, this is a user-configurable parameter. Some implementations calculate the dimensions of the texture using a predetermined formula. For example, the width of the texture is computed as 2^(round(log 2(sqrt(n/4)))), and the height of the texture is computed as ceil(n/width). In these calculations, round (rounding operation), log 2 (logarithm to base-2), sqrt (square-root), and ceil (ceiling) are well-known mathematical operations. Some implementations package the position vertices, normal vectors, UV coordinates of every mesh, and the acceleration structure representing the scene, into this texture (an 1-dimensional array, referred to as array in the following descriptions).

Some implementations decode the texture on the GPU by performing a sequence of operations as follows. Some implementations pick a position p (within the 1-dimensional array, array) to decode the encoded array from, and compute two integers y=p>>round(log 2(sqrt(n/4))), and x=p−(y<<round(log 2(sqrt(n/4)))). These operations are mathematically equivalent to the following, but the former equations take advantage of faster bit manipulation: y=p/2^(round(log 2(sqrt(n/4)))), and x=p %2^(round(log 2(sqrt(n/4)))). Some implementations fetch (or retrieve) the texel of the texture at position (x, y) and store the values to a four-element vector (sometimes called vec4). The RGBA channels of the four-element vector thus contains the following values from the original (1-dimensional) array: r=array[p*4], g=array[p*4+1], b=array[p*4+2], and a=array[p*4+3]. One or more shaders in the GPU perform path tracing on the input scene using the r, g, b, and a values. Thus, by packaging and transmitting the relevant data to the GPU in a texture, the data packaged is efficiently handled by one or more shaders on the GPU.

Figure 5A:
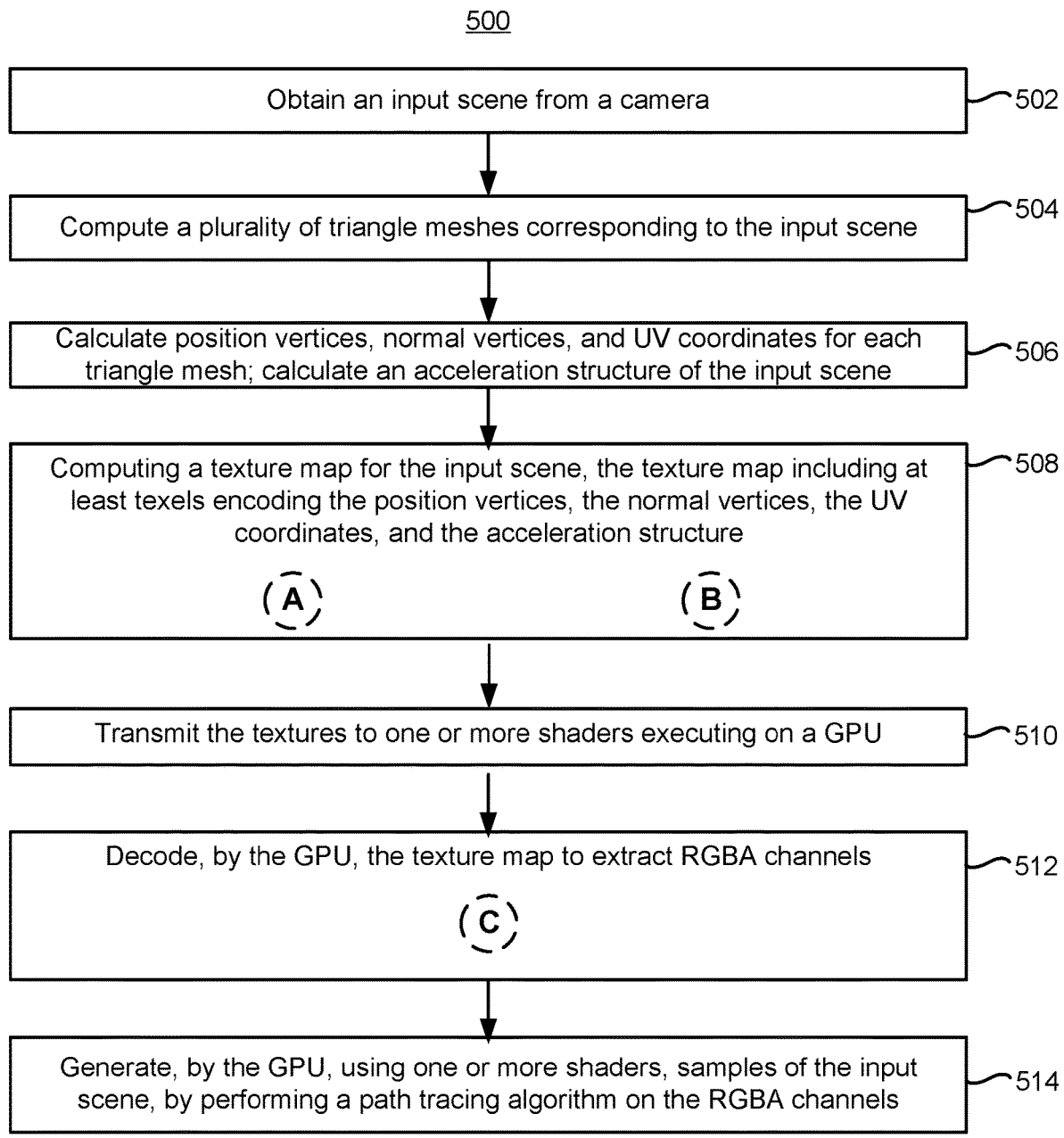
FIGS. 5A-5D provide a flowchart of a method for accelerating rendering of graphical images using a GPU in accordance with some implementations.

FIGS. 5A-5D provide a flowchart of a method 500 for accelerating rendering of graphical images using a GPU in accordance with some implementations. Referring to FIG. 5A, the method 500 includes obtaining (502) an input scene (e.g., the scene 402) from a camera (e.g., the image capturing device 104-2). The method also includes computing (502) a plurality of triangle meshes corresponding to the input scene (e.g., the information 430, as described above in reference to FIG. 4). The method also includes calculating (506) position vertices, normal vectors, and UV coordinates for each triangle mesh, and calculating a bounding volume hierarchy (BVH) of the input scene. The computing device computes (508) a texture map for the input scene by packaging at least texels encoding the position vertices, the normal vectors, the UV coordinates, and the BVH. The operations 502-508 are performed on a CPU (e.g., the CPU 112-2) according to some implementations. The method includes transmitting (510) the texture map (e.g., the texture 406) to the GPU (e.g., the GPU 112-4). The method further includes decoding (512), by the GPU, the texture map to extract RGBA channels. The method includes generating (514), by the GPU, using one or more shaders, samples of the input scene, by performing a path tracing algorithm on the RGBA channels.

Figure 5B:
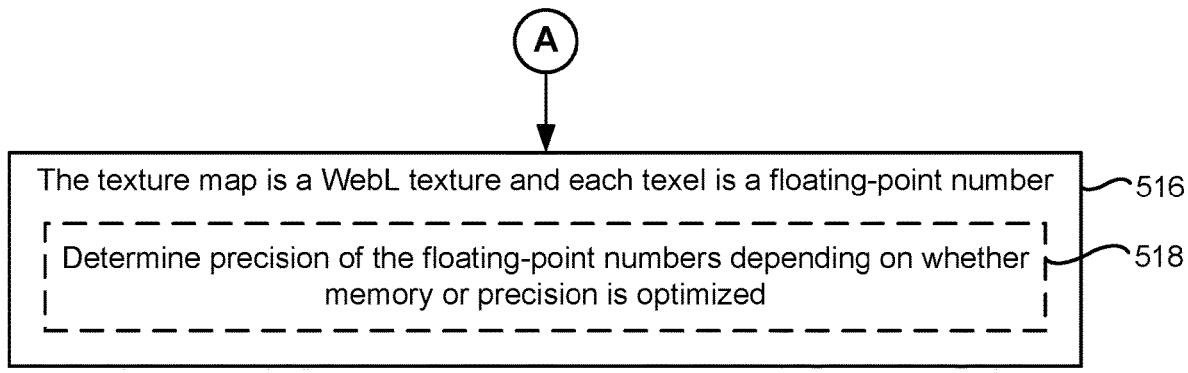

Referring next to FIG. 5B, in some implementations, the texture map (e.g., the texture 406) is (516) a WebGL texture, and each texel (e.g., the BVH 408) is a floating-point number. In some implementations, the method further includes determining (518) precision of the floating-point numbers depending on whether memory or precision is optimized. For example, 16-bits (g1.RGBA16F format) is used when optimizing for memory, and 32-bits (g1.RGBA32F) is used when optimizing for precision. Some implementations optimize for richness of image. For example, if memory is not a constraint then some implementations let the renderer run faster or longer to generate better image quality. And, if memory is a constraint (such as on WebGL, or low powered devices using WebGL), then some implementations throttle back the number of samples calculated per second, and/or the number of samples calculated per pixel.

Figure 5C:
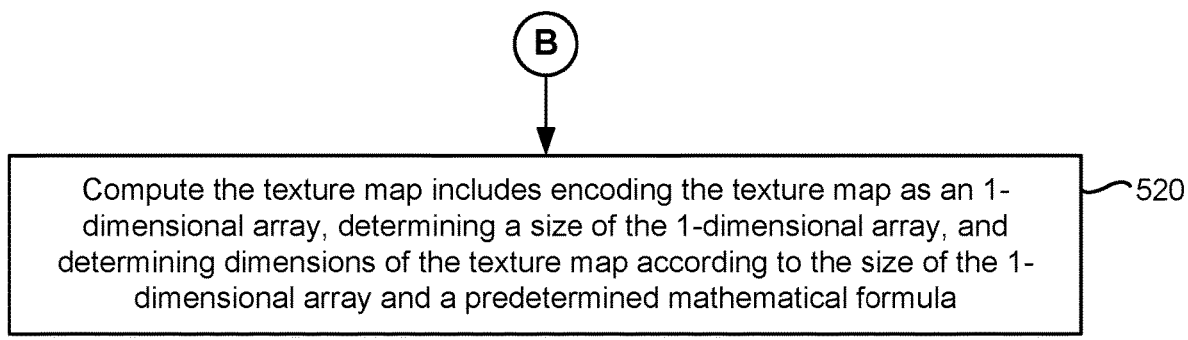

Referring next to FIG. 5C, in some implementations, computing the texture map includes encoding (520) the texture map as an 1-dimensional array, determining a size of the 1-dimensional array, and determining dimensions of the texture map according to the size of the 1-dimensional array and a predetermined mathematical formula.

Figure 5D:
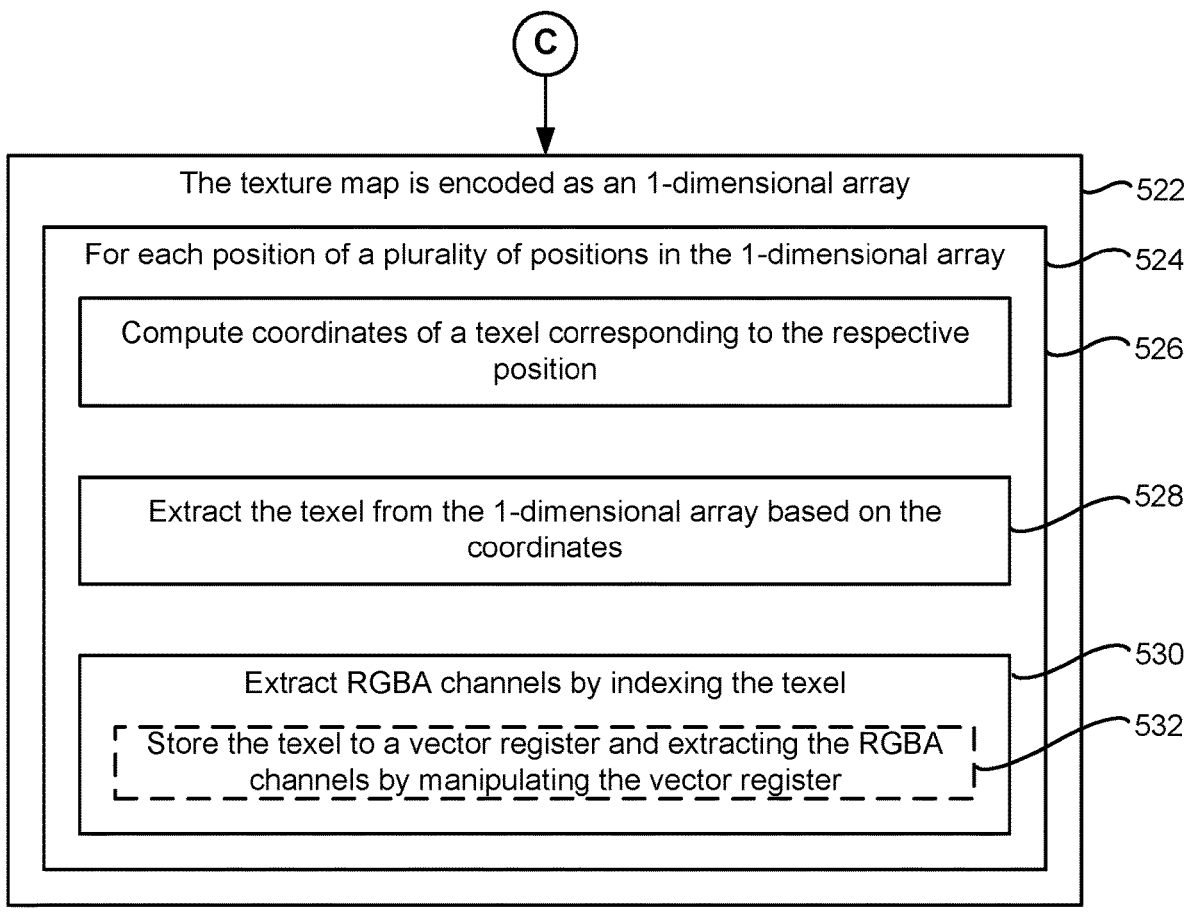

Referring next to FIG. 5D, in some implementations, the texture map is (522) encoded as an 1-dimensional array. The method includes decoding the texture map by performing a sequence of steps (524) for each position of a plurality of positions in the 1-dimensional array. The sequence of steps includes computing (526) coordinates of a texel corresponding to the respective position, extracting (528) the texel from the 1-dimensional array based on the coordinates, and extracting (530) RGBA channels by indexing the texel. In some implementations, the method includes storing (532) the texel to a vector register and extracting the RGBA channels by manipulating the vector register.

Thus, the techniques provided herein, in various implementations, enable users to start with an image captured using a camera and interact with a 3D model and measurements (or cost estimates) of objects in the image using an off-the-shelf web browser on a low-powered device regardless of speed of Internet connections.

Temporal Noise Reduction (Temporal De-Noising)

Because path tracing is a progressive rendering technique, the more samples that are rendered, the less noise that is visible in the image. Whenever the camera moves, the rendering process is restarted, which in some instances, leads to a less real-time experience, since the user is required to wait for several samples to render before the image becomes sufficiently noise-free. Temporal de-noising gets around this issue. By storing image(s) from previous camera angles, some implementations re-use samples from the image(s) by determining location of the old samples in the new image, and subsequently adding the samples to the new image. This technique is called "re-projection" and is a common technique in temporal anti-aliasing.

Figure 6:
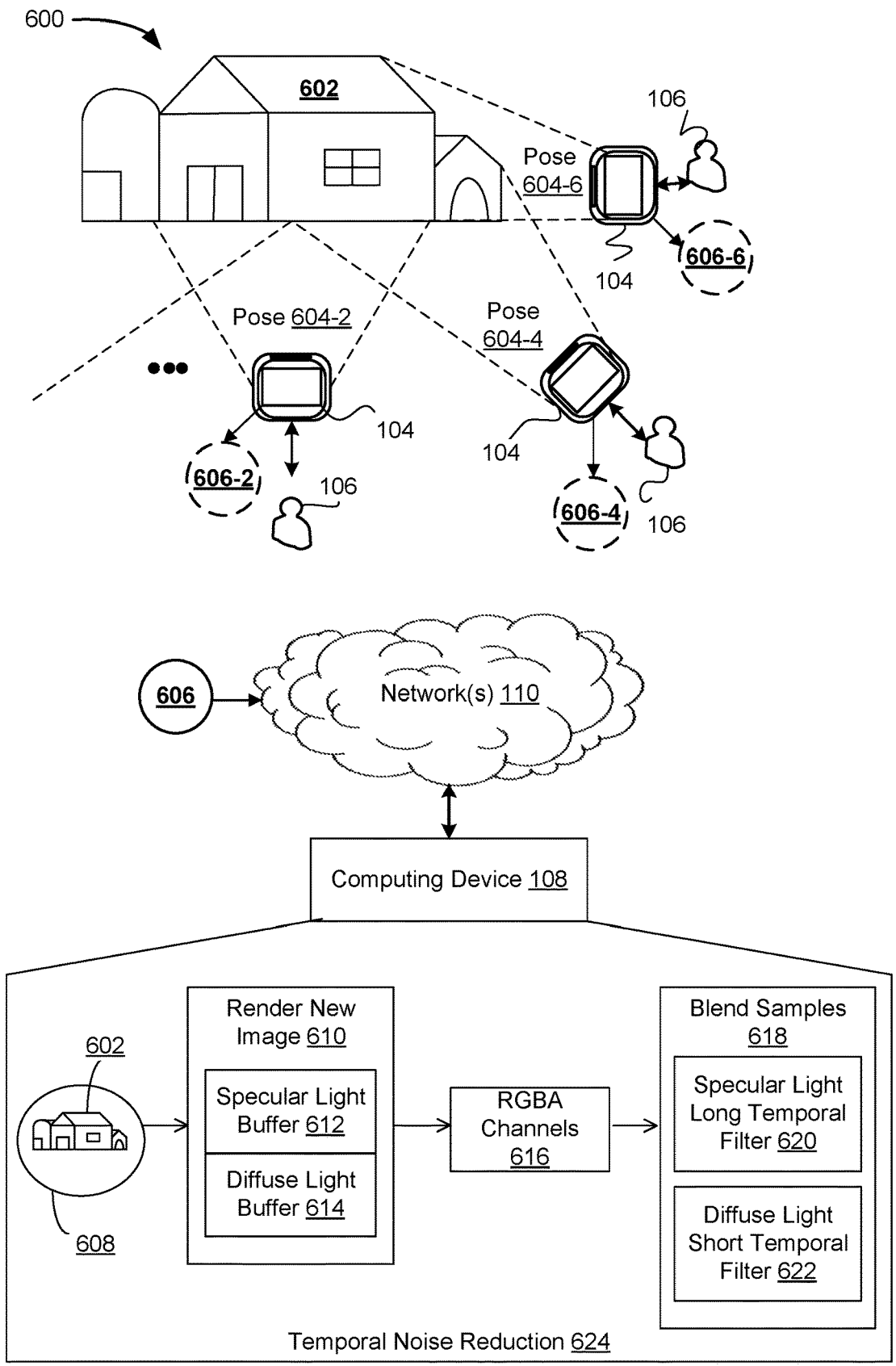
FIG. 6 is a block diagram of a computing system for temporal de-noising, in accordance with some implementations.

FIG. 6 is a block diagram of a computer system 600 that performs temporal de-noising (sometimes called temporal noise reduction) for rendering images using path tracing, in accordance with some implementations. In some implementations, the computer system 600 includes image capture devices 104, and a computing device 108. In some implementations, operations described herein are performed by the temporal noise reduction module 222-2.

An image capture device 104 communicates with the computing device 108 through one or more networks 110. The image capture device 104 provides image capture functionality (e.g., take photos of images) and communications with the computing device 108. In some implementations, the image capture device is connected to an image preprocessing server system (not shown) that provides server-side functionality (e.g., preprocessing images, such as creating textures, storing environment maps (or world maps) and images and handling requests to transfer images) for any number of image capture devices 104.

In some implementations, the image capture device 104 is a computing device, such as desktops, laptops, and mobile devices, from which users 106 can capture images (e.g., take photos), discover, view, edit, and/or transfer images. In some implementations, the users 106 are robots or automation systems that are pre-programmed to capture In some implementations, the image capture device 104 is an augmented reality camera or a camera phone capable of performing the image capture.

Typically, a user 106 walks around a building structure (e.g., the house 602), and takes pictures of the building 602 using the device 104 (e.g., an iPhone) at different poses (e.g., the poses 604-2, 604-4, and 604-6). Each pose corresponds to a different perspective or a view of the building structure 602 and its surrounding environment, including one or more objects (e.g., a tree, a door, a window, a wall, a roof) around the building structure. The poses may or may not overlap. For example, in FIG. 6, the poses 604-2 and 604-4 overlap, but the poses 604-2 and 604-6 do not overlap.

In some implementations, one or more samples from a prior pose are used to improve the rendering of an image captured at a subsequent pose. As described above, because path-tracing based rendering is a progressive technique, the quality of the image rendered improves over many samples. Temporal de-noising, reusing samples from a different frame (corresponding to a different pose) help improve the rendering.

At each pose, the device 104 obtains (118) images of the building 602 visible to the device 104 at the respective pose. For example, the device captures data 606-2 at the pose 604-2, the device captures data 606-4 at the pose 604-4, and the device captures data 606-6 at the pose 604-6.

Although the description above refers to a single device 104 used to obtain (or generate) the data 606, any number of devices 104 may be used to generate the data 606. Similarly, any number of users 106 may operate the device 104 to produce the data 606.

The data 606 is collectively a wide baseline image set, that is collected at sparse positions (or poses 604) around the building structure 602. In other words, the data collected may not be a continuous video of the building structure or its environment, but rather still images and/or related data with substantial rotation and/or translation between successive positions.

The computing device 108 obtains the data 606 via the network 110. Based on the data received, the computing device 108 performs temporal noise reduction (624) of the rendered image based on prior samples.

Some implementations obtain an input scene (e.g., the building structure 602), from a camera (e.g., the device 104), and render (610) a new image of the input scene (e.g., image 608) including separating the specular and diffuse light contributions to separate buffers (e.g., specular light buffer 612 and diffuse light buffer 614). Some implementations obtain an old image corresponding to a prior pose of the camera. The new image and old image include RGBA channels with red, green, and blue (RGB) channels set to light contribution, and alpha channel set to 1, for each pixel, collectively shown as RGBA channels 616. Some implementations blend samples (618) of a new image with re-projected samples of the old image, based on the alpha channel corresponding to each pixel of the new image, using a long temporal filter 620 for specular light, and a short temporal filter 622 for the diffuse light, based on separate buffers for the two types of light contributions. Examples of temporal de-noising are further described below, according to some implementations.

The computer system 600 shown in FIG. 6 includes both a client-side portion (e.g., the image capture devices 104) and a server-side portion (e.g., a module in the computing device 108). In some implementations, data preprocessing is implemented as a standalone application installed on the computing device 108 and/or the image capture device 104. In addition, the division of functionality between the client and server portions can vary in different implementations. For example, in some implementations, the image capture device 104 uses a thin-client module that provides only image search requests and output processing functions, and delegates all other data processing functionality to a backend server (e.g., the server system 120). In some implementations, the computing device 108 delegates image processing functions to the image capture device 104, or vice-versa.

The communication network(s) 110 can be any wired or wireless local area network (LAN) and/or wide area network (WAN), such as an intranet, an extranet, or the Internet. It is sufficient that the communication network 110 provides communication capability between the image capture devices 104, the computing device 108, and/or external servers (e.g., servers for image processing, not shown). Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The computing device 108 and/or the image capture devices 104 are implemented on one or more standalone data processing apparatuses or a distributed network of computers. In some implementations, the computing device 108 and/or the image capturing devices 104 also employ various virtual devices and/or services of third party service providers (e.g., third-party cloud service providers) to provide the underlying computing resources and/or infrastructure resources.

Example Implementations of Temporal De-noising

Some implementations render a new image with one path-traced sample per pixel. The image contains floating-point RGBA channels with the RGB channels equal to the light contribution, and the alpha channel set to 1.

In some implementations, the system (e.g., a separate shader pass) determines a surface position of each pixel and projects the position to the coordinates in the old image. Some implementations determine a mesh identifier of the surface at this coordinate. If the mesh identifier does not match for the old image and the new image, it means the surface on the new image is not visible in the old image, so no samples can be reused, and the system proceeds to the next step in the pipeline. If the identifiers match, the surface is visible between both images, so the system can reuse samples from the old image.

Some implementations re-use sample(s) by adding together the channels of both images. Since the alpha channel for each new image is equal to 1, adding the channels accumulates light, and the number of samples accumulated is stored in the resulting alpha channel. Subsequently (e.g., during a post-processing step), some implementations divide the RGB channels by the alpha channel to get the average contribution of light for that pixel.

In some implementations, the old image is subsequently set to be the accumulated image (e.g., the old image plus the new image), for use in a next cycle.

In some implementations, if the camera stays still, the system starts using less and less re-projected samples over time, since direct samples are more accurate than re-projected samples.

In some implementations, when moving the camera, the new samples are blended with old samples with an exponential average, so old samples become less significant over time. However, when the camera stays still, some implementations blend remaining old samples (e.g., over 100 frames or so), using a linear sum, until only the accumulated samples from the current camera angle (i.e., samples that are not re-projected) remain.

Some implementations use short filters and/or long filters. In some implementations, the current image is blended with the accumulated image via exponential averaging using the equation: $f\_n(p)=\alpha*s\_n(p)+(1-\alpha)*f\_n-1(\pi(p))$. In this equation, $f\_n$ is the new re-projected output, $f\_n-1$ is the previous re-projected output, $s\_n$ is the current 1 sample-per-pixel image, $\pi$ is the re-projection operator, and $\alpha$ is the blend factor, controlling the strength of the re-projection. A long filter means a lower $\alpha$ (0.01), which in turn means more samples are blended from the accumulated image. With a long filter, it takes longer until the accumulated samples become insignificant (when compared to the new samples being rendered). A short filter, on the other hand, means a higher $\alpha$ (0.05) meaning the accumulated samples carry less weight and are quicker to be overwritten by new samples being rendered.

Some implementations weigh the contribution of old image light and the new image light as follows. Some implementations store the number of samples rendered in the alpha channel for each pixel individually. Different pixels will have different numbers of samples rendered, according to when their coordinates are able to be reused from the previous image. Conventional path-tracing de-noising implementations don't use an alpha channel, so they're forced to use the same sample count for every pixel. With conventional systems, samples that are accumulated will factor only as much as new samples, leading to visual artifacts.

Specular reflections depend and change based on the angle of the camera. Reused samples from different camera angles are invalid for these types of reflections. During the ray tracing step, instead of combining all types of reflections into one light buffer, some implementations write specular light and diffuse light to separate buffers. During a re-projection step, some implementations blend new diffuse light with old diffuse light using a long temporal filter, since diffuse light is invariant of camera angle. Some implementations blend new specular light with a very short filter, so that light responds quickly to new camera angles. This effects strong de-noising for diffuse light, while also making the light more responsive to specular reflections.

FIGS. 7A-7F provide a flowchart of a method 700 for rendering images using path tracing, and performing temporal de-noising, in accordance with some implementations. In some implementations, the method 700 is performed by the temporal noise reduction module 222-2.

The method includes obtaining (702) an input scene from a camera (e.g., a physical camera hardware in a smartphone, or a virtual camera, such as a software representation of a camera (view) in a 3D scene). In some implementations, this step includes initializing an input scene that includes meshes, lights, and cameras. The input scene is a virtual scene in this case. Rendering systems use a graph, usually called the scene graph, to represent the objects the renderer in question would "render" from a camera view (virtual camera). In some implementations, scenes include a 3D mesh of a property that is reconstructed from smartphone photos, lights (one ambient light, one directional light), a terrain mesh, a sky mesh. Some implementations initialize scenes with different configurations, including other objects (trees, interiors, etc.).

The method also includes rendering (704) a current frame of the input scene from a current pose, with one path-traced sample per pixel, including storing specular and diffuse light contributions to separate buffers. Some implementations use diffuse maps to identify specular and diffuse lights.

The method also includes obtaining (706) a prior frame corresponding to a prior pose of the camera. The current frame and the prior frame have at least one overlapping pixel and each of the current frame and prior frame image data includes RGBA channels with red, green, and blue (RGB) channels set to light contribution, and alpha channel set to 1, for each pixel.

The method also includes re-projecting (708) samples from the prior frame into the current frame (sometimes referred to as blending the current frame with re-projected samples from the prior frame) based on the alpha channel corresponding to each overlapping pixel with the current frame, including (i) blending diffuse light of the current frame with diffuse light of at least the prior frame using a long temporal filter, and (ii) blending specular light of the current frame with specular light of at least the prior frame using a short temporal filter, based on the separate buffers for the specular and diffuse light. These steps assure that light responds quickly to new camera angles, and/or preserve the strong de-noising for diffuse light, while also making the light more responsive to specular reflections.

Figure 7A:
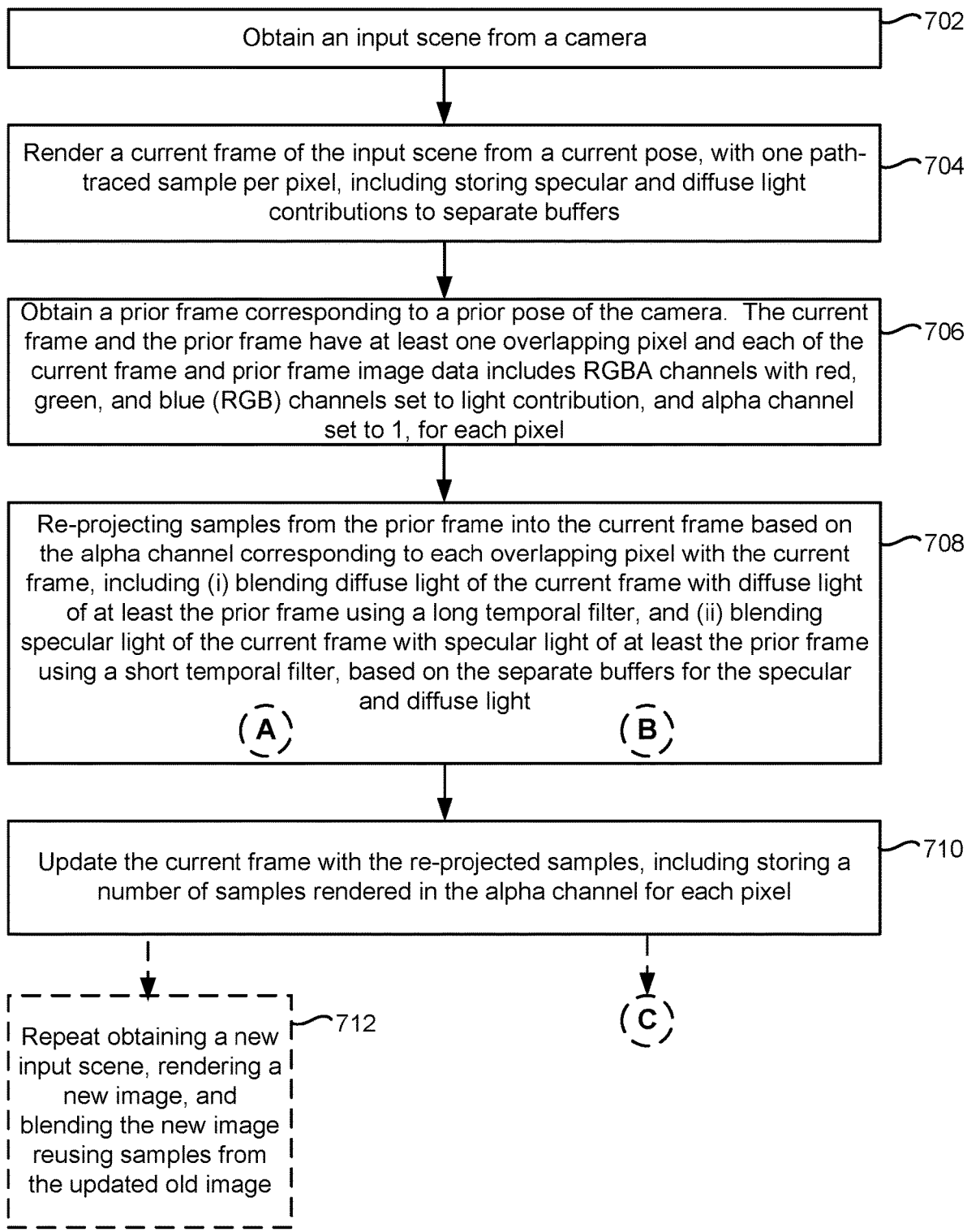
FIGS. 7A-7F provide a flowchart of a method for rendering images using path tracing, and for performing temporal denoising, in accordance with some implementations.
Figure 7B:
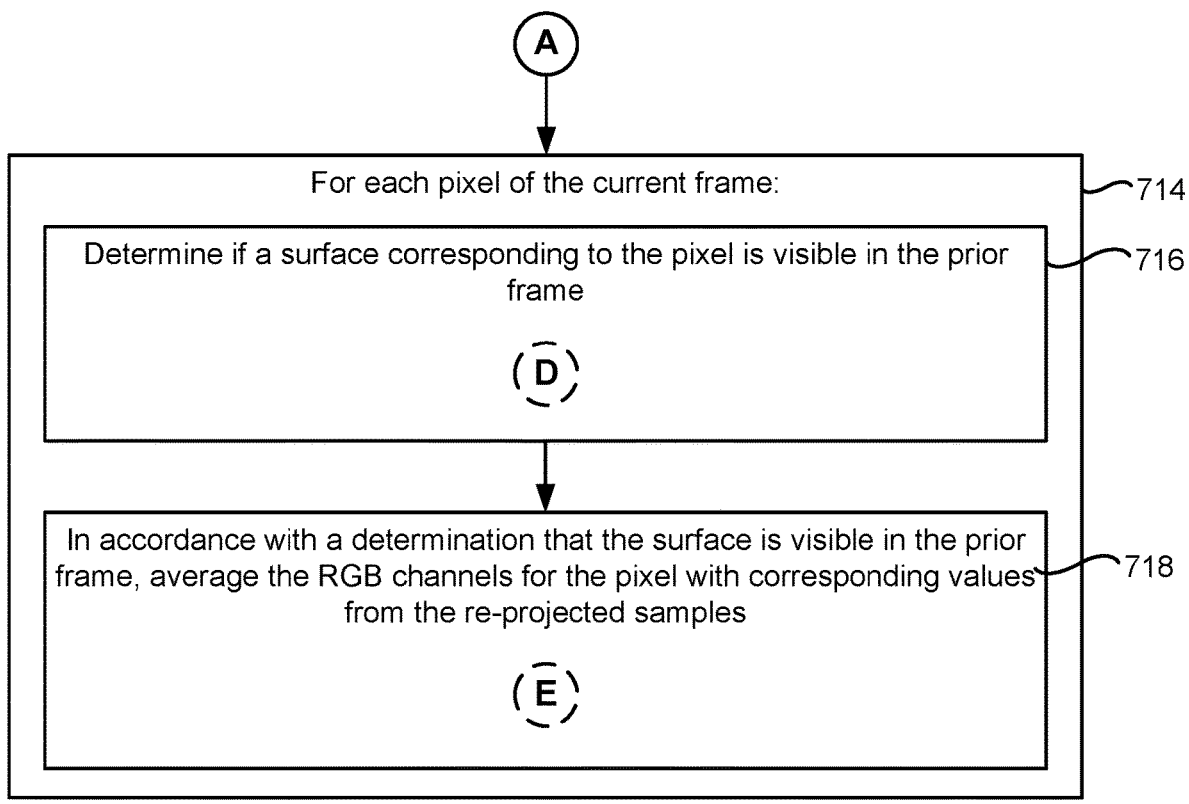

Referring next to FIG. 7B, in some implementations, re-projecting samples from the prior frame into the current frame includes, for each pixel (714) of the current frame: (i) determining (716) if a surface corresponding to the pixel is visible in the prior frame; and (ii) in accordance with a determination that the surface is visible in the prior frame, averaging (718) the RGB channels for the pixel with corresponding values from the re-projected samples.

Figure 7C:
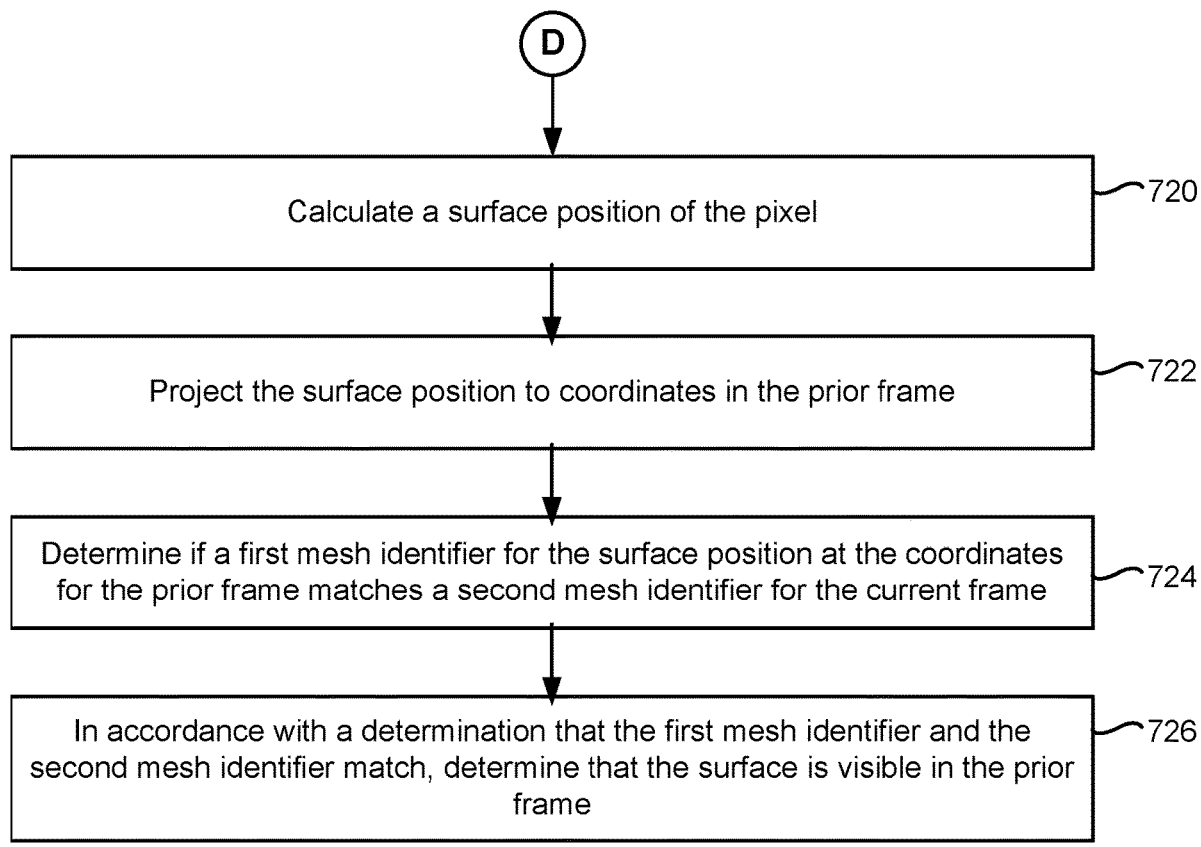

Referring next to FIG. 7C, in some implementations, determining if the surface is visible includes: (i) calculating a surface position of the pixel; (ii) projecting the surface position to coordinates in the prior frame; (iii) determining if a first mesh identifier for the surface position at the coordinates for the prior frame matches a second mesh identifier for the current frame; and (iv) in accordance with a determination that the first mesh identifier and the second mesh identifier match, determining that the surface is visible in the prior frame.

Figure 7D:
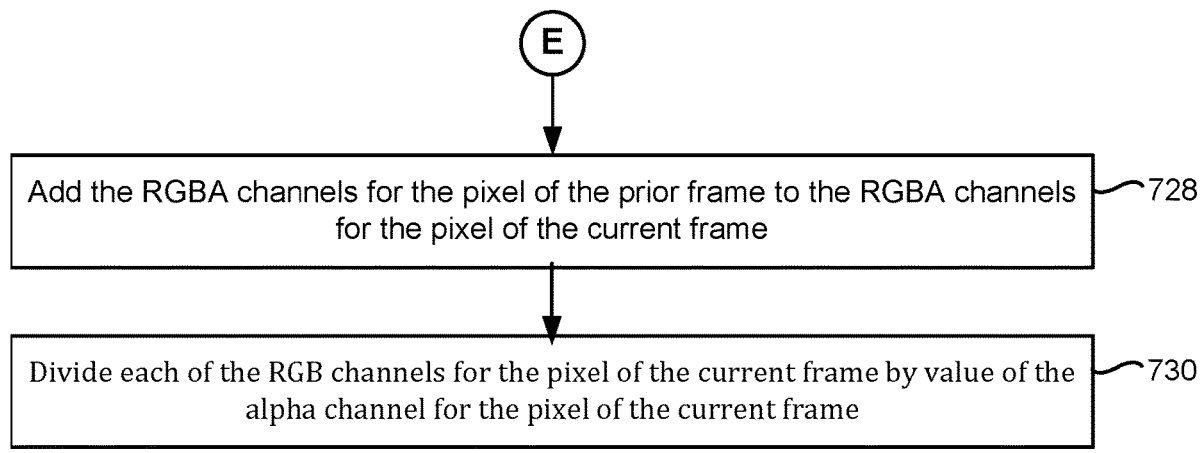

Referring next to FIG. 7D, averaging the RGB channels includes: (i) adding (728) the RGBA channels for the pixel of the prior frame to the RGBA channels for the pixel of the current frame; and (ii) dividing (730) each of the RGB channels for the pixel of the current frame by value of the alpha channel for the pixel of the current frame.

Figure 7E:
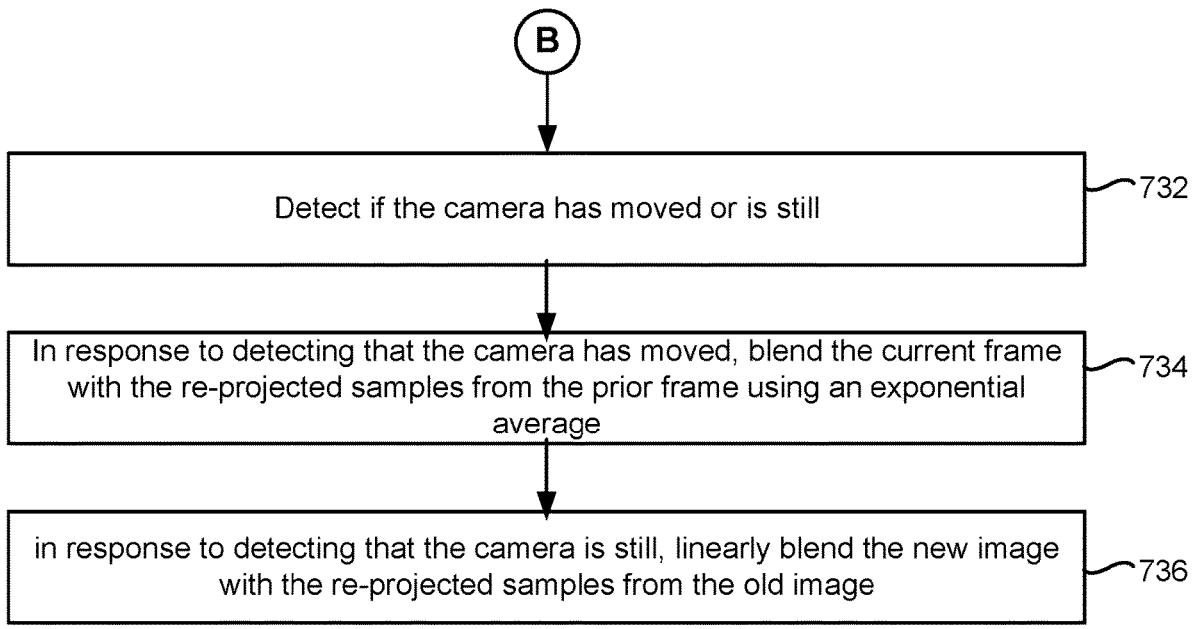

Referring next to FIG. 7E, the method further includes: (i) detecting (732) if the camera has moved or is still; (ii) in response to detecting that the camera has moved, blending (734) the current frame with the re-projected samples from the prior frame using an exponential average; and (iii) in response to detecting that the camera is still, linearly blending (736) the current frame with the re-projected samples from the prior frame.

Referring back to FIG. 7A, the method also includes updating (710) the prior frame using the new image to obtain an updated prior frame, including storing number of samples rendered in the alpha channel for each pixel.

The method also includes repeating (712) obtaining a new input scene, rendering a new image, and blending the new image reusing samples from the updated prior frame.

Figure 7F:
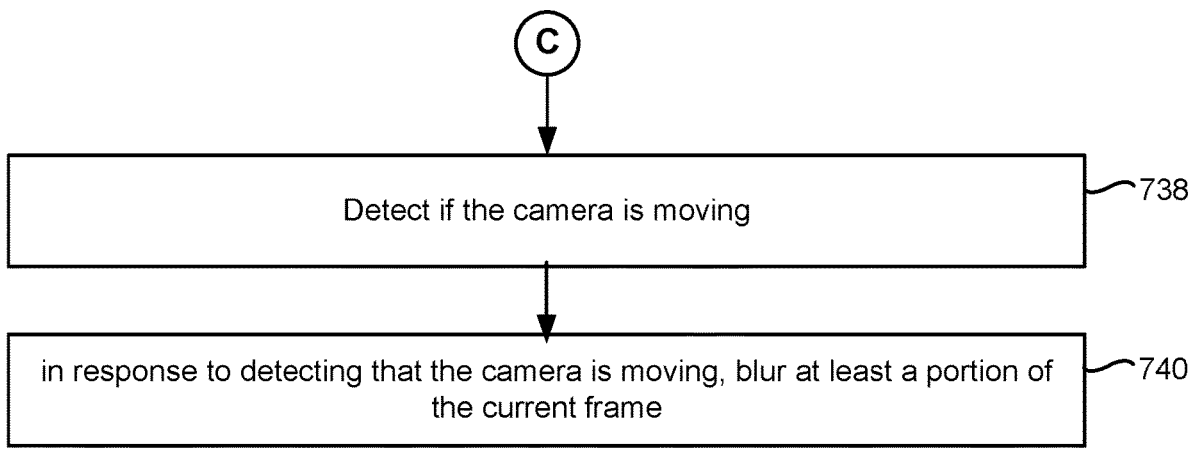

Referring next to FIG. 7F, the method further includes: (i) detecting (738) if the camera is moving; and (ii) in response to detecting that the camera is moving, blurring (740) at least a portion of the new image. Blurring is the effect of not being able to re-project. In other words, the current pixel wasn't visible in the previous frame. Some implementations cast new rays to path trace. The averaging (across many frames) causes the blurring in such sections of the image.

Referring back to FIG. 7A, in some implementations, the method further includes repeating (712) obtaining a new input scene, rendering a current frame, and blending the current frame reusing samples.

As described above, some implementations separate diffuse and specular light buffers into their own buffers. This especially works well in instances where the scenes include two lights—an ambient light and a static directional light. These lights do not change during the execution of the program. This allows diffuse light to preserve strong denoising by using a long temporal filter in the re-projection step (diffuse light is invariant of camera angle). On the other hand, new specular light is blended with a very short temporal filter so that light responds quickly to new camera angles.

From a user perspective, areas with less reflected light stay crisp and virtually noise-free. When the camera moves, some implementations trade the noise for blurriness. Blur and noise are undesired artifacts, but "blurring effects" are more visually pleasing than "noise."

In this way, some implementations use the alpha channel (in texture) to store the number of accumulated samples per pixel. Each pixel has a different number of accumulated (alpha) values over time. This information is used to improve real-time rendering of images. On the other hand, conventional systems use a single value to represent all pixels, and do not alleviate blurriness or ghosting. The techniques disclosed here are useful for rendering both static scenes and dynamic scenes.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer system for rendering images using path tracing, comprising:
    one or more processors, including a general purpose processor and a graphics processing unit (GPU);
    a display; and
    memory;
    wherein the memory stores one or more programs configured for execution by the one or more processors, and the one or more programs comprising instructions for:
    obtaining an input image having a current pose;
    rendering a current frame of the input image with a path-traced sample per pixel;
    obtaining a prior frame corresponding to a prior pose, wherein the current frame and the prior frame have at least one overlapping pixel and each of the current frame and prior frame image data includes an alpha channel set to luminance contribution, for each pixel;
    re-projecting samples from the prior frame into the current frame based on the alpha channel corresponding to each overlapping pixel with the current frame, including (i) blending diffuse light of the current frame with diffuse light of at least the prior frame using a long temporal filter, and (ii) blending specular light of the current frame with specular light of at least the prior frame using a short temporal filter; and
    modifying the current frame with the re-projected samples, including storing a number of samples rendered in the alpha channel for each pixel.

2. The computer system of claim 1, wherein obtaining the prior frame corresponding to the prior pose comprises determining if a first mesh identifier for the at least one overlapping pixel in the prior frame matches a second mesh identifier for the overlapping pixel in the current frame.

3. The computer system of claim 1, wherein modifying the current frame with the re-projected samples comprises averaging a color channel value for the pixel in the current frame with corresponding values from the re-projected samples.

4. The computer system of claim 3, wherein averaging a color channel comprises:
    summing the color channel value for the pixel of the prior frame to the color channel value of the current frame; and
    modifying the summed color channel value by the current frame's alpha channel value for that pixel.

5. The computer system of claim 1, wherein re-projecting samples from the prior frame into the current frame comprises:
    determining if a surface corresponding to a pixel of the current frame is visible in the prior frame; and
    in accordance with a determination that the surface is visible in the prior frame, averaging color channels for the pixel with corresponding values from the re-projected samples.

6. The computer system of claim 1, wherein the one or more programs further comprise instructions for:
    detecting if a camera used to obtain the input image has moved; and in response to detecting that the camera has moved, blending the current frame with the re-projected samples from the prior frame using an exponential average.

7. The computer system of claim 1, wherein the one or more programs further comprise instructions for:
   detecting if a camera used to obtain the input image is still; and
   in response to detecting that the camera is still, linearly blending the current frame with the re-projected samples from the prior frame.

8. The computer system of claim 1, wherein the one or more programs further comprise instructions for:
   detecting if a camera used to obtain the input image is moving; and
   in response to detecting that the camera is moving, blurring at least a portion of the current frame.

9. The computer system of claim 1, wherein the one or more programs further comprise instructions for:
   repeating obtaining a new input scene, rendering a current frame, and blending the current frame reusing samples.

10. The computer system of claim 1, wherein (i) blending the diffuse light of the current frame with diffuse light of at least the prior frame using a long temporal filter, and (ii) blending the specular light of the current frame with specular light of at least the prior frame using a short temporal filter, is based on separate buffers for the specular light and the diffuse light.

11. A method of rendering images using path tracing, the method comprising:
   obtaining an input image having a current pose;
   rendering a current frame of the input image with a path-traced sample per pixel;
   obtaining a prior frame corresponding to a prior pose, wherein the current frame and the prior frame have at least one overlapping pixel and each of the current frame and prior frame image data includes an alpha channel set to luminance contribution, for each pixel;
   re-projecting samples from the prior frame into the current frame based on the alpha channel corresponding to each overlapping pixel with the current frame, including (i) blending diffuse light of the current frame with diffuse light of at least the prior frame using a long temporal filter, and (ii) blending specular light of the current frame with specular light of at least the prior frame using a short temporal filter; and
   modifying the current frame with the re-projected samples, including storing a number of samples rendered in the alpha channel for each pixel.

12. The method claim 11, wherein obtaining the prior frame corresponding to the prior pose comprises determining if a first mesh identifier for the at least one overlapping pixel in the prior frame matches a second mesh identifier for the overlapping pixel in the current frame.

13. The method of claim 11, wherein modifying the current frame with the re-projected samples comprises averaging a color channel value for the pixel in the current frame with corresponding values from the re-projected samples.

14. The method of claim 13, wherein averaging a color channel comprises:
   summing the color channel value for the pixel of the prior frame to the color channel value of the current frame; and
   modifying the summed color channel value by the current frame's alpha channel value for that pixel.

15. The method of claim 11, wherein re-projecting samples from the prior frame into the current frame comprises:
   determining if a surface corresponding to a pixel of the current frame is visible in the prior frame; and
   in accordance with a determination that the surface is visible in the prior frame, averaging color channels for the pixel with corresponding values from the re-projected samples.

16. The method of claim 11, further comprising:
   detecting if a camera used to obtain the input image has moved; and
   in response to detecting that the camera has moved, blending the current frame with the re-projected samples from the prior frame using an exponential average.

17. The method of claim 11, further comprising:
   detecting if a camera used to obtain the input image is still; and
   in response to detecting that the camera is still, linearly blending the current frame with the re-projected samples from the prior frame.

18. The method of claim 11, further comprising:
   detecting if a camera used to obtain the input image is moving; and
   in response to detecting that the camera is moving, blurring at least a portion of the current frame.

19. The method of claim 11, further comprising:
   repeating obtaining a new input scene, rendering a current frame, and blending the current frame reusing samples.

20. The method of claim 11, wherein (i) blending the diffuse light of the current frame with diffuse light of at least the prior frame using a long temporal filter, and (ii) blending the specular light of the current frame with specular light of at least the prior frame using a short temporal filter, is based on separate buffers for the specular light and the diffuse light.

* * * * *